United States Patent [19]

Takahashi et al.

[11] Patent Number: 5,051,755
[45] Date of Patent: Sep. 24, 1991

[54] THERMAL PRINTING APPARATUS

[75] Inventors: Toshinori Takahashi, Kawasaki; Itsuo Takanashi, Kamakura; Hideshi Tanaka, Yokohama; Terumi Ohara, Yokohama; Kenichi Miyazaki, Yokohama; Hiroki Kitamura, Tokyo; Toru Nibe, Yokosuka; Tadao Shinya; Yutaka Mizoguchi, both of Yokohama; Katsuhiko Terada, Yokosuka, all of Japan

[73] Assignee: Victor Company of Japan, Ltd., Japan

[21] Appl. No.: 377,999

[22] Filed: Jul. 11, 1989

[30] Foreign Application Priority Data

Jul. 12, 1988 [JP] Japan .................. 63-173545
Sep. 29, 1988 [JP] Japan .................. 63-244779

[51] Int. Cl.$^5$ .................................. G01D 15/10
[52] U.S. Cl. .................................. 346/76 PH
[58] Field of Search .................. 346/76 PH

[56] References Cited

U.S. PATENT DOCUMENTS 4,652,892 3/1987 Tanaka .................. 346/76 PH
4,661,825 4/1987 Tsuchihashi et al. .......... 396/76 PH

FOREIGN PATENT DOCUMENTS 59-107681 6/1984 Japan .
60-134662 7/1985 Japan .
61-208366 9/1985 Japan .
61-154959 7/1986 Japan .
62-32059 2/1987 Japan .
62-41235 2/1987 Japan .
62-165474 7/1987 Japan .
62-196855 8/1987 Japan .
63-859 1/1988 Japan .

Primary Examiner—Benjamin R. Fuller
Assistant Examiner—Gerald E. Preston
Attorney, Agent, or Firm—Lowe, Price, Leblanc & Becker

[57] ABSTRACT

A thermal printing apparatus prints input gradational images, characters and figures by using multilevel density regulates the levels of the densities representing the gradational images etc. to be printed by a linear thermal head having n heating resistors arranged in a row. The printing apparatus is provided with a density control unit for regulating, for example, the multilevel durations for energizing the heating resistors in accordance with n gradational printing data each corresponding to a respective one of said resistors, and a data conversion unit, receiving as printing data a set of n original data for each a plurality of lines parallel with the row of n resistors, for producing p sets of n data for p split lines on the basis of the n original data, where p is an integer equal to or greater than two, each of the p split lines being disposed in an area in which the line corresponding to the printing data should be printed, in parallel with the row of n resistors, the p sets of n data being sequentially supplied to the density control unit set by set to print the original line corresponding to the printing data by printing the split lines corresponding to the original line split line by split line so by shifting the linear thermal head in a direction perpendicular to the row of n resistors every time each of the split lines is printed, that each of the n printing data is represented by p dots.

4 Claims, 23 Drawing Sheets

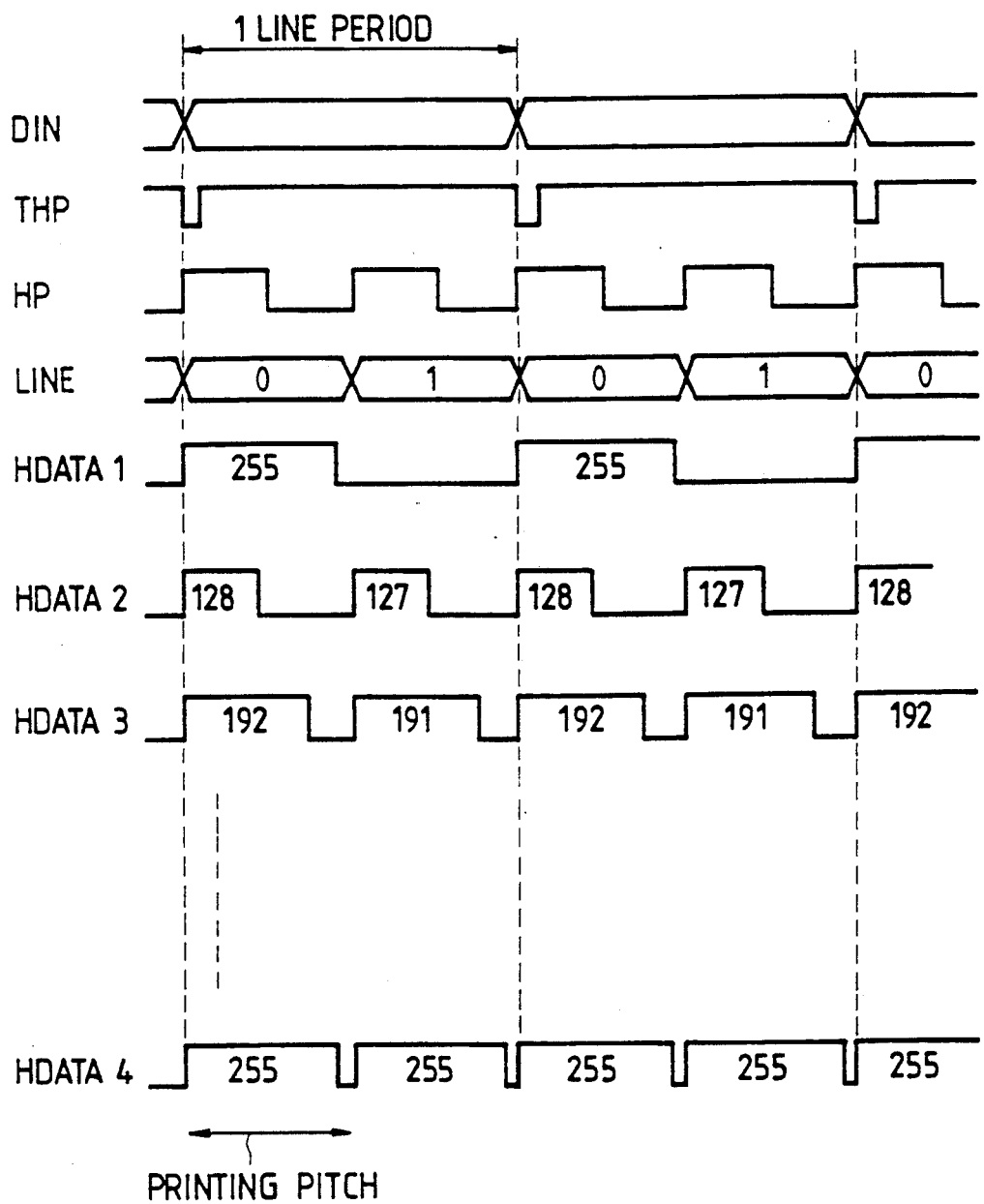

FIG. 8(c)

| CD | DIN LINE | 0 | 1 | 2 | 3 | ----- | 253 | 254 | 255 |
|---|---|---|---|---|---|---|---|---|---|
| 2 | 0 | 0 | 0 | 1 | 1 | ----- | 126 | 127 | 127 |
|   | 1 | 0 | 1 | 1 | 2 | ----- | 127 | 127 | 128 |
| 4 | 0 | 0 | 0 | 0 | 0 | ----- | 63 | 63 | 63 |
|   | 1 | 0 | 0 | 0 | 1 | ----- | 63 | 63 | 64 |
|   | 2 | 0 | 0 | 1 | 1 | ----- | 63 | 64 | 64 |
|   | 3 | 0 | 1 | 1 | 1 | ----- | 64 | 64 | 64 |

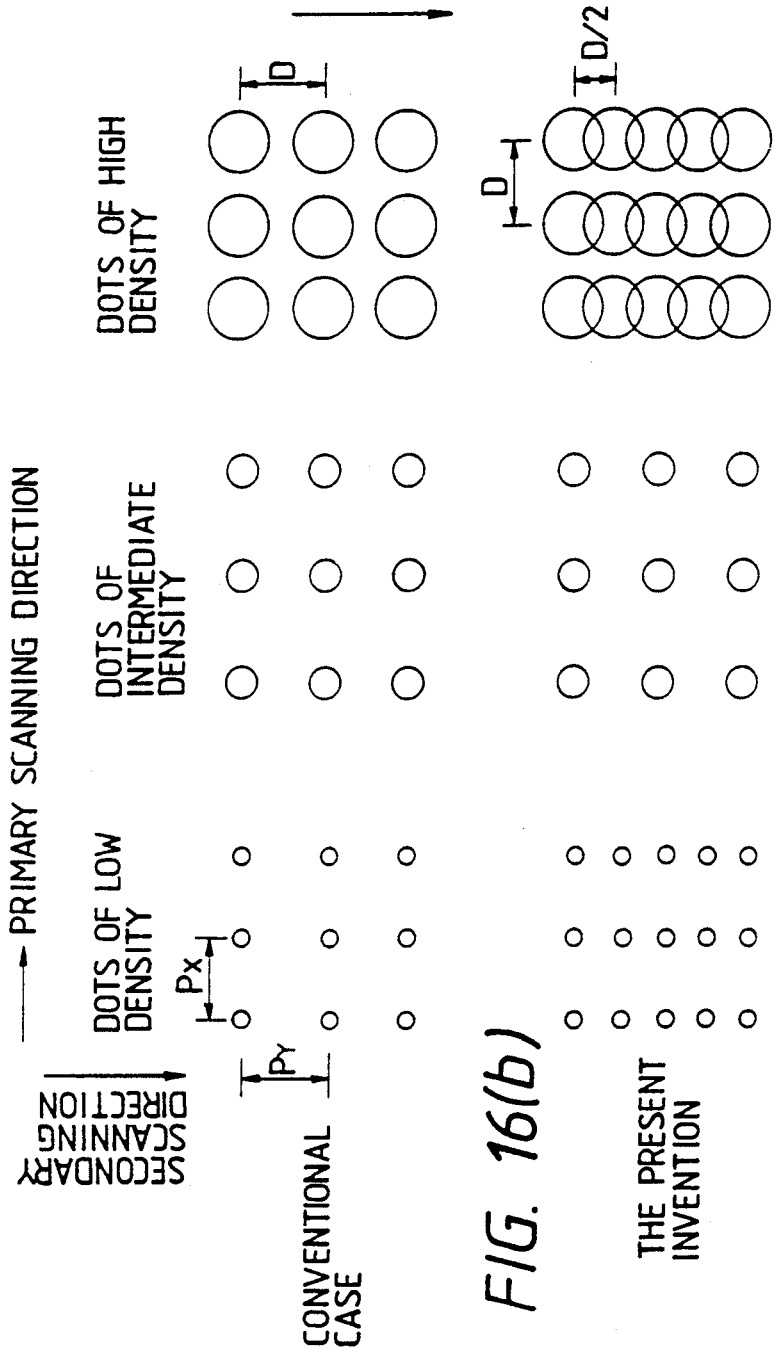

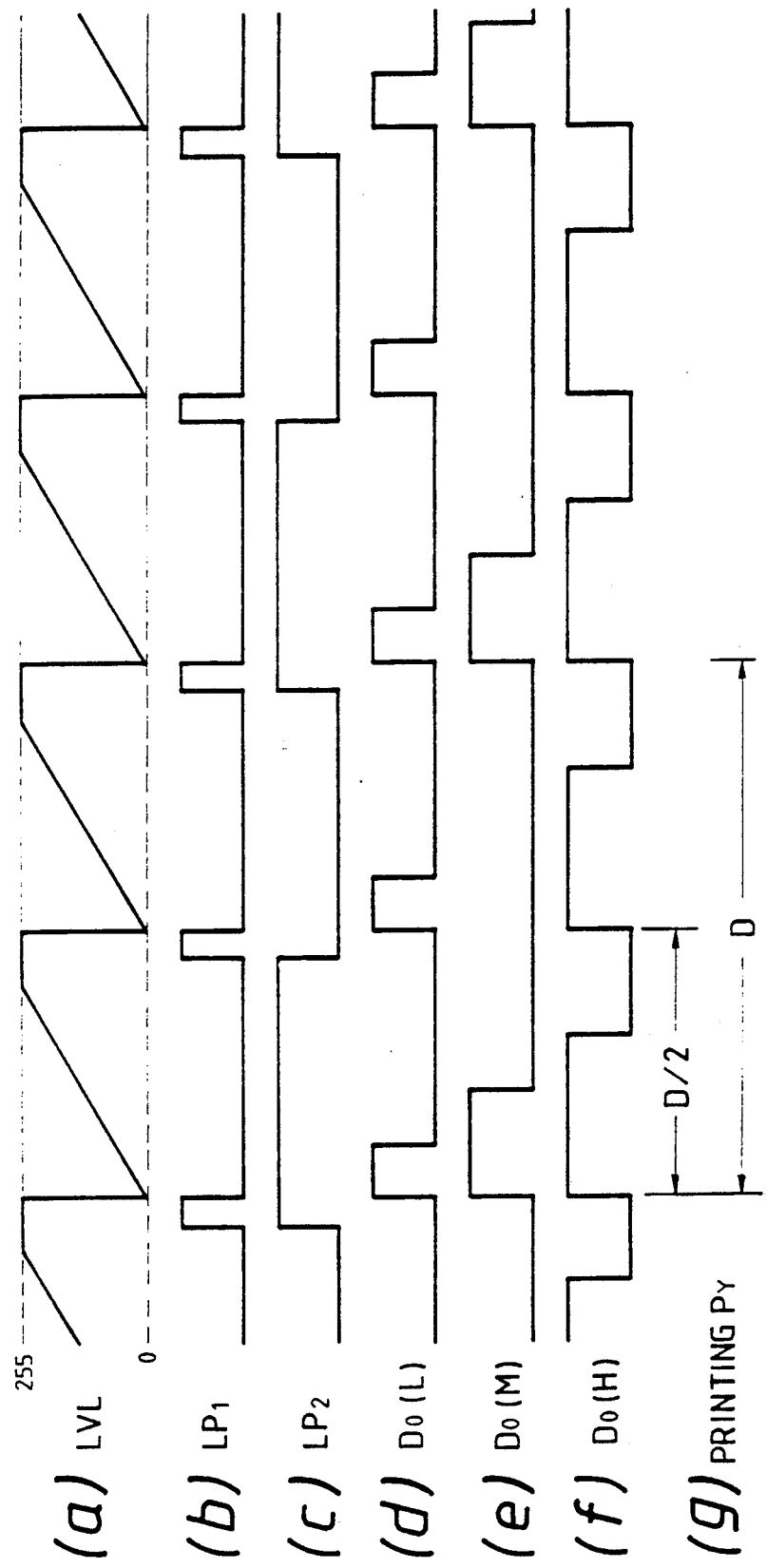

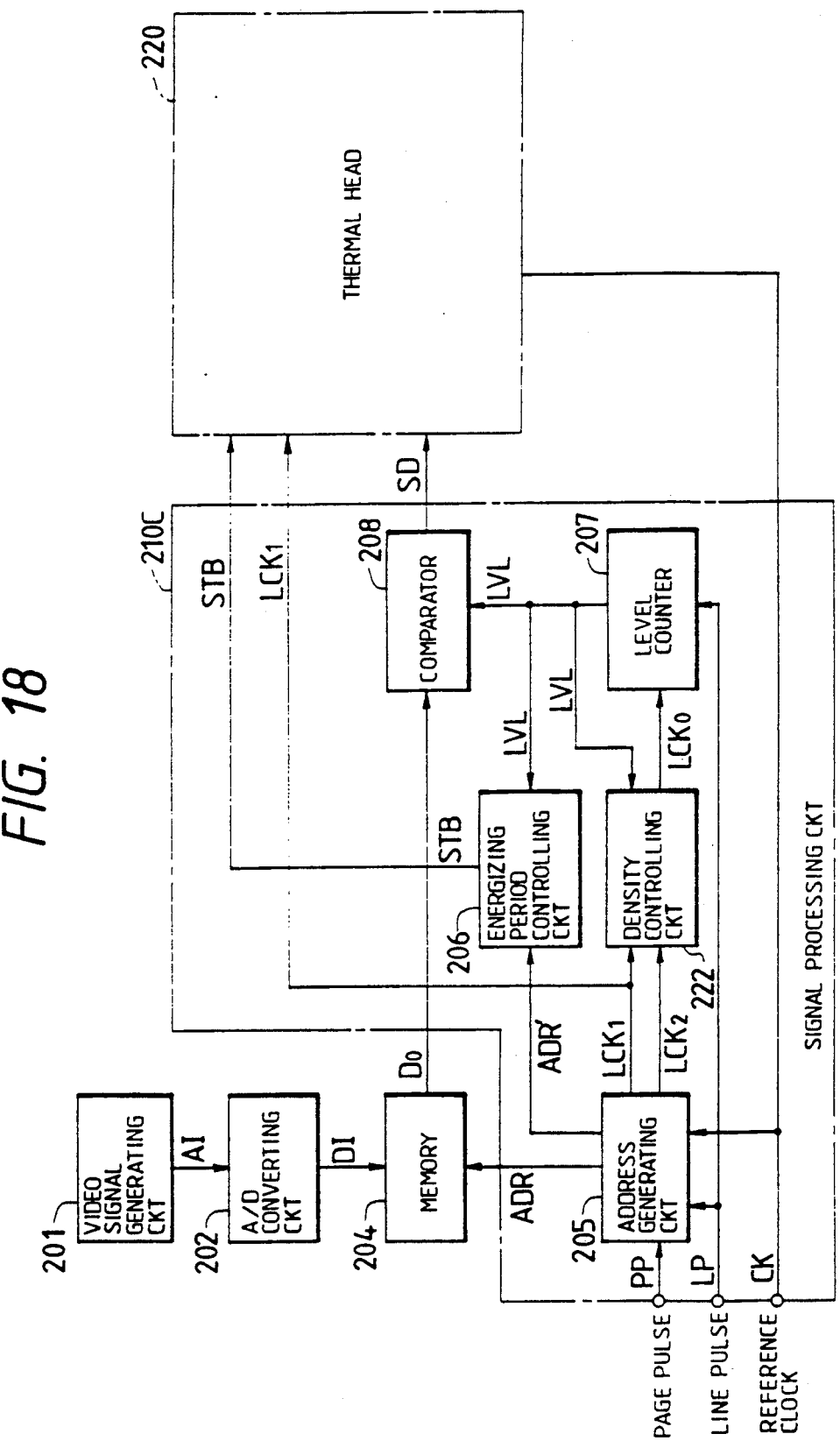

FIG. 27
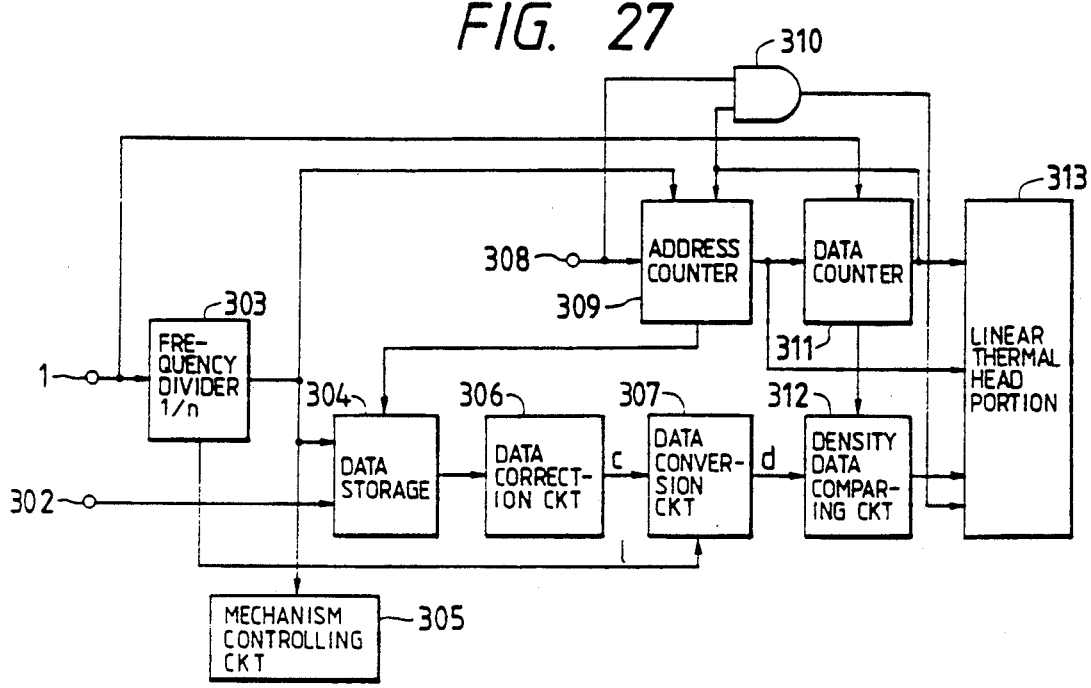
FIG. 28(a)
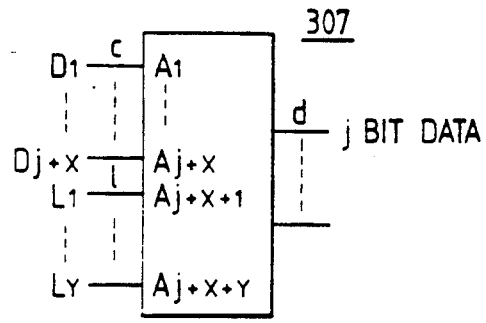
FIG. 28(b)
| $D_1$-$D_{j+x}$ \ $L_i$ | 0 | 1 | 2 | 3 | --- | 250 | 251 | 252 | 253 | 254 | 255 |
|---|---|---|---|---|---|---|---|---|---|---|---|
| 1 | 0 | 0 | 0 | 0 | --- | 62 | 62 | 63 | 63 | 63 | 63 |
| 2 | 0 | 0 | 0 | 1 | --- | 62 | 63 | 63 | 63 | 63 | 63 |
| 3 | 0 | 0 | 1 | 1 | --- | 63 | 63 | 63 | 63 | 63 | 63 |
| 4 | 0 | 1 | 1 | 1 | --- | 63 | 63 | 63 | 63 | 63 | 63 |

THERMAL PRINTING APPARATUS

BACKGROUND OF THE INVENTION

1. Field of the Invention

This invention generally relates to a thermal printing apparatus and more particularly, to a thermal printing apparatus for printing multilevel density images, characters and figures which can appropriately regulate the levels of the densities used for representing the gradational images, characters and figures printed by using a thermal head thereof.

2. Description of the Related Art

As a conventional method of printing images, characters or figures by converting input data representing characters or figures to be printed into signals to be applied to a thermal head, the Japanese Patent Application Provisional Publication No. 59-107681 discloses a method for gradational display of characters or figures including steps of generating pulses each having width corresponding to the input data and energizing a thermal head by applying these pulses to the thermal head. In case of this method, the input data are printed by one dot at each line pitch and the printing portion of the thermal head is sequentially moved in a primary scanning direction (see FIG. 7 (a)) of the thermal head.

FIGS. 7 (a) and 7 (b) are diagrams for illustrating this conventional method for gradational printing of images, characters or figures. Particularly, FIG. 7 (a) is a diagram for showing a group of resistors for emitting heat arranged in a line composing the linear thermal head. FIG. 7 (b) is a diagram for showing an area, on which dots are printed by these resistors for emitting heat, on the surface of a sheet of recording paper. Further, FIG. 7 (c) is a diagram for showing energizing pulses to be applied to each of the resistors for emitting heat. In these figures, reference characters $R_1$, $R_2$, ... and $R_n$ indicate resistors for emitting heat of the linear thermal head; $1_{TH}$ a pitch (hereunder referred to as a thermal head pitch) or distance between two contiguous dots in the primary scanning direction; $1_{THP}$ a pitch (hereunder sometimes referred to as data printing pitch) or distance between two contiguous lines of dots in a secondary scanning direction of relatively moving the thermal head; and $t_{11}$ ... and $t_{n2}$ energizing periods of time for energizing the resistors of the thermal head. As shown in these figures, in case of such conventional method, the period of time (hereunder sometimes referred to as energizing period) for energizing each of the resistors $R_1$, $R_2$, ... and $R_n$ is controlled in accordance with gradational printing data of 1 line as to each resistor. Further, the printing of a character is effected by allocating one dot to an area of $1_{TH} \times 1_{THP}$.

However, in case of using thermal sublimation ink, the above described prior art gradational printing method has encountered the following problems:

(1) The density of a peripheral portion of a printed dot is low. Thus, a portion of low density is generated in each area of $1_{TH} \times 1_{THP}$ with results that sufficient density of the whole area allocated to a dot cannot be obtained.

(2) If the power supplied to the thermal head is increased to obtain further higher density, deformation due to heat is caused on the surface of the recording paper and as a result the density and the luster of an image are decreased.

By the way, the thermal printers are nowadays widely used as the apparatus for producing hard copy to be used for personal computers, word processors, video displays and so on.

The thermal printer records an image by supplying the preferable printing pulses to many heat emitting elements (hereunder sometimes referred to simply as resistors) provided on a thermal head and using thermal dye transfer printing paper or heat sensitive printing paper. In recent years, among such thermal printers, has become widely used an apparatus for printing a gradational image or multilevel density image by supplying printing pulses, of which power correspond to the density levels of an input image, to each heat emitting element.

When recording such a multilevel density image, data represented by using 8 bits or so corresponding to input image signal are employed as input data. Further, the period for energizing the resistors is selected to correspond to the input data. It has been, however, known that if the increment of the period of energizing the resistors to be used to print data having higher density by one level is set as constant, the actual density of a printed image cannot accurately correspond to the input data.

FIG. 21 is a graph showing the relation between the actual density of the printed image and the energizing period for energizing the resistors.

As shown in this figure, the actual density of the printed image is not necessarily linearly proportional to the energizing the resistors. That is, in a low density region L and a high density region H, the gradient of the curve is small and in contrast that of the curve is large in an intermediate density region which is present between the low and high density regions L and H. This is owing to characteristics of the printing paper such as transfer paper that the sensitivity thereof to heat is small in the low and high density regions L and H.

To obtain desirable printed image of which the density accurately corresponds to the input data, has been developed the conventional apparatus, for example, disclosed in the Japanese Patent Application Provisional Publication No. 61-208366. This apparatus is provided with a signal processing circuit which appropriately selects the increment of the energizing period for energizing the resistors such that the increment of the energizing period corresponding to the change of one level of the density in the low and high density regions is larger than that of the energizing period corresponding to the change of one level of the density in the intermediate density region.

However, the above described conventional apparatus has a drawback that the process of the determination of the increment of the energizing period is complex and thus there is necessity of very troublesome process to determine the optimal conditions in designing the circuits. Further, the conventional apparatus has defects that if the difference between the maximum value and the minimum value of the energizing periods is large, the number of bits required to represent correction data for correcting the increment is extremely increased, that complex configuration of the circuits is necessary and that the processing time of printing the multilevel density image is substantially increased.

Furthermore, the conventional apparatus has encountered problems that as shown in FIG. 21, in case that the density of the printing data is in the low and high density regions in which the sensitivity of the recording paper to heat corresponding to the energizing period is small, it is necessary for obtaining the desirable density of the printed image which further accurately corresponds to the printing data to take longer time to control the energizing period and thereby the printing of the multilevel density image cannot be effected at high speed.

Furthermore, a thermal dye transfer printing apparatus has been conventionally employed as an apparatus for producing a hardcopy of a still picture generated by a duplicator, a facsimile equipment or the like for business or private use. This thermal dye transfer printer employs an inked film formed by applying thermally fusable ink or thermal sublimation ink on a side of a film which is made of polyester and of which the thickness ranges from 5 $\mu$m to 6 $\mu$m. An inked front surface of this inked film is touched with a recording paper and further a linear thermal head is pressed to the back surface of the paper. When the linear thermal head is energized, it emits heat. Thus, the ink applied at the position on the front surface of the film corresponding to the thermal head is melted and transferred to the recording paper. The thermal head is provided with a plurality of resistors arranged in a line and further the resistors are energized in sequence to emit heat.

The densities representing the gradation of the printed characters, figures and pictures are determined on the basis of areas and densities (that is, number per unit area) of dots formed on the paper by transferring the melted ink thereto. Further, the areas and the densities of the dots of the melted ink are determined on the basis of the quantity of electric current applied to each resistor. In general, the longer a period for energizing the resistor becomes, the larger the quantity of emitted heat becomes, that is, the larger the areas and the densities of the dots become. Thus, as the period for energizing the resistor becomes longer, the density of characters and so forth gets near a saturation value thereof.

FIG. 32 shows an example of the related density controlling apparatus having a data correcting circuit as the above described embodiment of the present invention. In this apparatus, density data are sent from a terminal 327 to a data storage 328. On the other hand, an address counter 329 is supplied with reference clock signals from a terminal 330 and a starting pulse from a terminal 331 and sends addresses (hereunder sometimes referred to simply as first addresses), which are to be fed for the first time, to the data storage 328. Furthermore, the starting pulse is supplied to a mechanism controlling circuit 332 to control an input mechanism. The data storage 328 sends out density data corresponding to the first addresses, that is, density data sent from an analog-to-digital (A/D) converting circuit 302 for the first time to a data correcting circuit 333, which is used to compensate the density data by taking effects of heat generated in the printing operation thereon into account, as described in the Japanese Patent Application Provisional Publications No. 62-41235 or 62-196855. Further, the data correcting circuit 333 sends the density data corrected by it to a density comparing circuit 334. At that time, the count to be stored in a data counter 335 is set as "1". Then, reference density data, which are sequentially increased in accordance with the count held in the data counter 335, are supplied from a data counter 335 to the density data comparing circuit 334. The density data comparing circuit 334 compares the corrected density data with the reference density data "1" indicating the minimum coloring density. Further, the circuit 334 sends a control data "1" to the linear thermal head portion 336 if the corrected density data is equal to or greater than the reference density data "1" or sends another control data "0" to the portion 336 if less than the reference density data "1".

After the processing of the density data corresponding to the first addresses is completed in the above described manner, the address counter 329 sends second, third, . . . and n-th addresses, which are data to be sent for the second, third, . . . and n-th time, respectively, to the data storage 328 in sequence. The data storage 328 sends out density data corresponding to each of the second, third, . . . and n-th addresses to the density data comparing circuit 334 in sequence each time receives the second, third, . . . or n-th time addresses. The density data corresponding to the first, second, third, . . . and n-th addresses corresponds to printing density data to be printed by the first, second, third, . . . and n-th resistors of the thermal head, respectively. The density data comparing circuit 334 compares the density data corresponding to each of the second, third, . . . and n-th addresses with the reference density data "1" and sends out the control data "1" or "0" to the linear thermal head portion 336 in accordance with the results of the comparison.

When the address counter 29 finishes counting the first, second, third, . . . and n-th addresses, the counter 29 sends a data transferring pulse to both of the data counter 335 and the linear thermal head portion 336. When receives the data transferring pulse, the data counter 335 supplies heating pulses to both the address counter 329 and an AND-circuit 337 at the same time and changes the value of the reference density data from "1" into "2" which is the minimum coloring density data but one. On the other hand, the reference clock signal is supplied from a terminal 331 to a terminal of the AND-circuit 337 which outputs a pulse to the linear thermal head portion 336 simultaneously with the reception of the heating pulse.

Next, the address counter 329 is reset by the heating pulse and one more counts first, second, . . . and n-th addresses in sequence. Thereafter, n density data are compared with the second reference density data "2" in the density data comparing circuit 14 in sequence. In case that the reference density data is "2", the data counter 315 and the AND-circuit 320 and so on operates similarly as in case that the reference density data is "1" and outputs control data. Further, a heating pulse is applied to the linear thermal head 336 and the resistor corresponding to the outputted density data is energized and emits heat.

However, the above described related apparatus has a defect that if the number of the density levels used to print or reproduce the characters and so on is increased by increasing the number of bits used for representing input density data or if the number of bits required for representing density data to be processed is increased by the data correcting circuit 306, the number of bits used for representing the density data to be processed in the data comparing circuit 334 is thus increased and further the configuration of the circuits of the apparatus becomes complex.

The present invention is accomplished to eliminate the above described defects and solve the above described problems of the conventional apparatus or of the related apparatus.

It is therefore an object of the present invention to provide a thermal printing apparatus for printing multi-level density images, characters and figures which can appropriately regulate the levels of the densities used for representing the gradational images, characters and figures printed.

Another object of the present invention is to provide a thermal printing apparatus including a density controlling unit which can obtain sufficient densities of printed images, characters and figures.

A further object of the present invention is to provide a thermal printing apparatus including a density controlling apparatus which can facilitate the correction of the printing data and can increase the quality of the image in the low and high density regions by improving the operation of printing data of which the density is in the low and high density regions.

A still further object of the present invention is to provide a thermal printing apparatus including a density controlling unit which can obtain further greater number of density levels used to print the characters and so on by means of circuits having relatively simple configuration.

SUMMARY OF THE INVENTION

To achieve the foregoing object and in accordance with a first aspect of the present invention, there is provided a thermal printing apparatus for printing input gradational images, characters and figures by using multilevel density, said printing apparatus comprising:

a linear thermal head having n resistors arranged in a line for emitting heat;

density controlling means for regulating multilevel durations for energizing said resistors in accordance with n gradational printing data each corresponding to a respective one of said resistors; and data conversion means for receiving as printing data a set of n original data for each of a plurality of lines which are respectively parallel with said row of n resistors, for producing p sets of n data for p split lines on the basis of said n original data, where p is an integer equal to or greater than two, each of said p split lines being disposed in an area in which the line corresponding to said printing data should be printed, in parallel with said row of n resistors, said p sets of n data being sequentially supplied to said density controlling means set by set to print an original line corresponding to said printing data by printing the split lines corresponding to the original line split line by split line by shifting said linear thermal head in a direction perpendicular to said row of n resistors every time each of the split lines is printed, so that each of said n printing data is represented by p dots;

wherein values of p data produced on the basis of each of the original data, which values indicate the durations for energizing each of said resistors, are fixed such that said durations are separately shorter than a duration indicated by each of the original data.

Thus, by applying energizing current to the resistors of the thermal head for a period of time of which is shorter than the period of time required by the conventional apparatus to print dots of the maximum density, an area of which density is higher than the maximum density in case of the conventional apparatus can be formed on the surface of a sheet of recording paper. Further, the portions of low density in dots can be efficiently overlapped, thereby obtaining sufficient density of printed dots without causing heat deterioration on the surface of a sheet of recording paper. Further, the number of dots per unit area on the surface of a sheet of recording paper is increased, thereby making individual printed dots indistinguishable from each other.

In accordance with a second aspect of the present invention, there is provided a thermal printing apparatus having a linear thermal head including heat emitting elements for emitting heat to print dots on the surface of recording paper, the thermal printing apparatus printing gradational images by supplying printing pulses having the power corresponding to printing data indicated by input image signals to the heat emitting elements to print the gradational image, the thermal printing apparatus including a density controlling unit for receiving and correcting input density data of input gradational image and outputting regulated input density data as printing data, memory means connected to the density controlling unit for receiving the printing data from the density controlling unit and storing the printing data of at least one line and a signal processing circuit connected to the memory means for determining the power corresponding to the printing data to be supplied to the heat emitting element, the density controlling unit converting the input data into the printing data such that the printing data is linearly proportional to the actual density of printed dots.

Thus, the preferable printing data are obtained by preliminarily converting input data and are inputted to the signal processing circuit which receives the printing data and controls the energizing period. Thereby, change in an increment for correcting the energizing period in the signal processing circuit can be small and the configuration of circuits of the apparatus can be simplified.

In accordance with a third aspect of the present invention, there is provided a thermal printing apparatus having a linear thermal head including heat emitting elements for emitting heat to print dots on the surface of recording paper, the thermal printing apparatus printing gradational images by supplying printing pulses having the power corresponding to printing data indicated by input image signals to the heat emitting elements to print the gradational image, the thermal printing apparatus having a signal processing circuit for determining the power corresponding to printing data to be supplied to the heat emitting elements, the signal processing circuit including a printing operation controlling circuit for effecting the operation of printing dots by using a pitch obtained by reducing a data printing pitch in a secondary scanning direction when the densities indicated by the printing data are in the low or high density region.

Thus, in this apparatus pursuant to the present invention, the pitch in the secondary scanning direction is decreased in case where the levels of the density are in the low and high density regions. Thereby, the number of printed dots per unit of area can be substantially increased and the actual density of printed dots can be desirably increased in the low and high density region in which the sensitivity of the recording paper to heat is small.

In accordance with a fourth aspect of the present invention, there is provided a thermal printing apparatus having a linear thermal head including heat emitting elements for emitting heat to print dots on the surface of recording paper, the thermal printing apparatus printing gradational images by supplying printing pulses having the power corresponding to printing data indicated by input image signals to the heat emitting elements to print the gradational image, the thermal printing apparatus having a signal processing circuit for determining the power corresponding to printing data to be supplied to the heat emitting element, the signal processing circuit including a density controlling circuit means for reducing the number of times of comparing the printing data with reference density levels in case where the densities indicated by the printing data are in the low or high density region.

Thus, the frequency of the comparison effected in the comparator for comparing the printing data signal with the density level signal in case where the levels are in the low and high density regions is greater than that of the comparison in case where the levels are in the intermediate region. That is, each of the energizing period in case where the levels of the densities are in the low and high density regions is longer than in case where the levels of the densities are in the intermediate region, though the total period of time required to print the data is not substantially lengthened. Thereby, the actual density of the printed dots in case where the levels of the densities are in the low and high density regions can be increased without lengthening the total period of time required to print dots.

In accordance with a fifth aspect of the present invention, there is provided a thermal printing apparatus for printing input gradational images, characters and figures by using multilevel density, the printing apparatus having a linear thermal head including n resistors arranged in a line for emitting heat and a density controlling unit for regulating the multilevel period of time for energizing each of the resistors in accordance with n gradational printing data represented by using the predetermined number of bits, each of the printing data corresponding to different one of the resistors, the density controlling means including a data converting circuit means for receiving input data represented by bits of the number which is larger than the predetermined number and producing a plurality of printing data each of which is represented by using bits of the same number with the predetermined number from the input data, thereby printing dots on a plurality of lines during a period of time required for printing dots on a line.

Thus, the printing data, that is, the divided density data represented by bits, of which the number is equal to that of bits used to represent the control data used for controlling the energizing period for energizing the resistors of the thermal head, are produced from the input data represented by bits of which the number is greater than that of bits representing the control data. Further, the process of printing characters and so on is effected by dividing the period of time required to print dots on a line into a plurality of periods of time required to print dots on plural lines. Thereby, the number of bits representing the input data can be set as more greater value and as a consequence the density levels used to reproduce gradational characters, figures and so on can be increased without increasing the number of bits of the density data in the part of the processing posterior to the stage of dividing the density data. Further, if the number of bits representing the input data is increased as above described, the density controlling process can be performed without loss of the quantity of the information. Furthermore, by increasing the divisor used for dividing the density data, the number of bits representing the divided density data can be decreased in comparison with number of bits representing the input data and thus the construction of circuits can be substantially simplified.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 3 is a timing chart for illustrating an operation of the density controlling device of FIG. 1;

FIG. 8(c) is a diagram for showing data set in a read-only memory of FIG. 8(b);

FIG. 16(a) is an enlarged view of the arrangement of printed dots in case of the conventional case;

FIG. 16(b) is an enlarged view of the arrangement of printed dots in case of the present invention;

FIG. 17 is a timing chart for illustrating an operation of the embodiment of FIG. 13;

FIG. 18 is a schematic block diagram for showing still another apparatus embodying the present invention;

FIG. 27 is a schematic block diagram for showing a still further embodiment of the present invention;

FIG. 28(a) is a diagram for showing the construction of an example of the data conversion circuit of FIG. 27;

FIG. 28(b) is a diagram for showing an example of data inputted to the data conversion circuit of FIG. 28(a);

DETAILED DESCRIPTION OF PREFERRED EMBODIMENTS

Hereinafter, preferred embodiments of the present invention will be described with reference to the accompanying drawings.

Figure 2A:
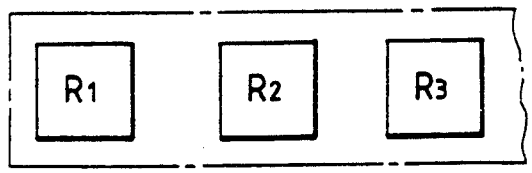
FIG. 2(a) is a diagram for illustrating a gradational printing process effected in an apparatus of the present invention.
Figure 2B:
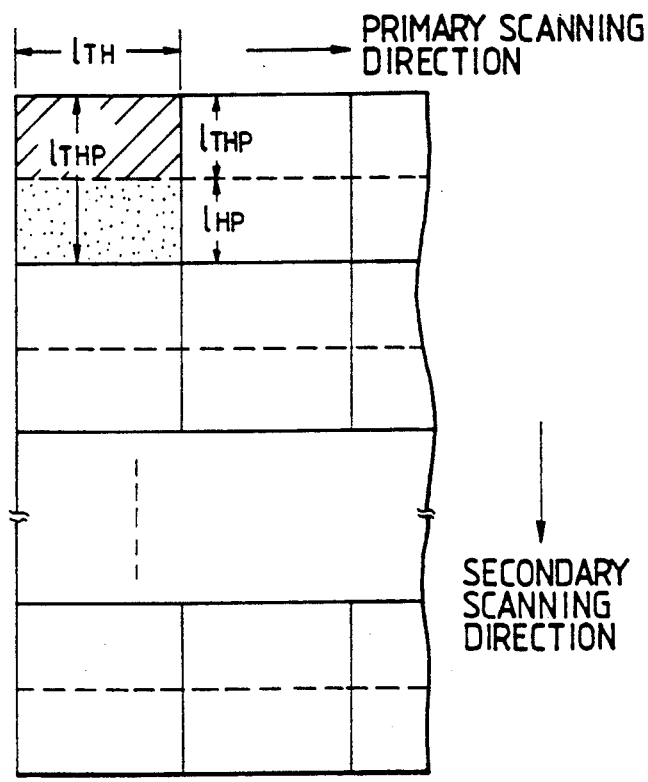
FIG. 2(b) is a diagram for showing an area, on which dots are printed, on the surface of the recording paper.
Figure 2C:
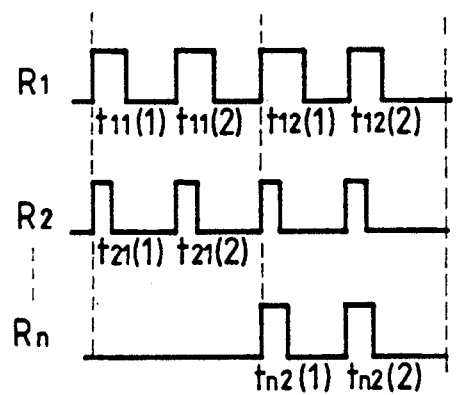
FIG. 2(c) is a diagram for showing an energizing pulse for energizing resistors of a thermal head.
Figure 7A:
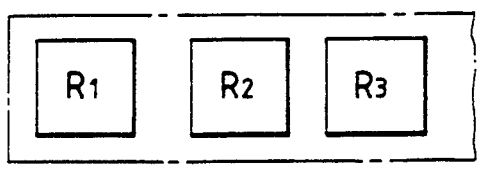
FIG. 7(a) is a diagram for showing a group of resistors for emitting heat arranged in a line composing the linear thermal head.
Figure 7B:
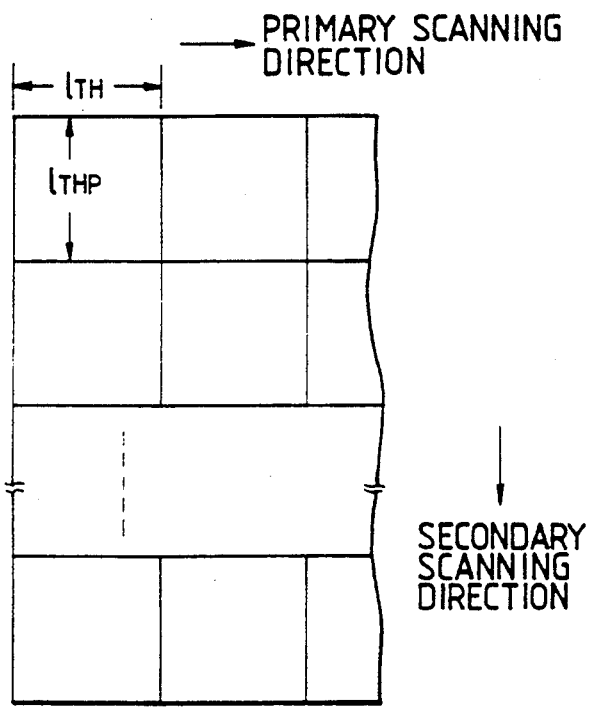
FIG. 7(b) is a diagram for showing an area, on which dots are printed by these resistors for emitting heat, on a sheet of paper.
Figure 7C:
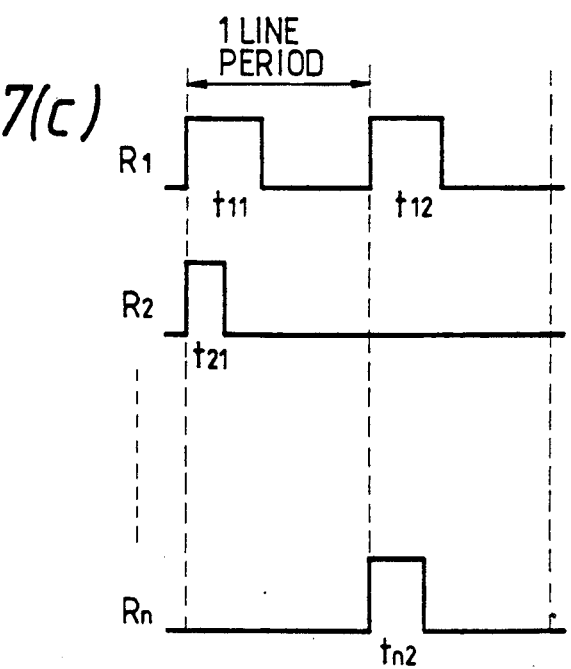
FIG. 7(c) is a diagram for showing energizing pulses to be applied to each of the resistors for emitting heat.

FIGS. 2(a), (b) and (c) are diagrams for illustrating a gradational printing process effected in an apparatus of the present invention. These figures correspond to FIGS. 7(a), (b) and (c), respectively. FIG. 2(a) is a diagram for showing a group of resistors for emitting heat arranged in a line to compose a linear thermal head. Further, FIG. 2(b) is a diagram for showing an area on a sheet of paper on which dots are printed by the groups of the resistors and FIG. 2(c) is a diagram for showing energizing pulses applied to each of the resistors in which reference characters such as $t_{11}(1)$ indicate periods (hereunder sometimes referred to simply as energizing periods) of time when the pulses are applied to the resistors. In this embodiment, assuming that a positive integer p is equal to or more than 2, hatched portions shown in FIG. 2(b) on the sheet of paper are first printed and thereafter the linear thermal head is shifted by a data printing pitch $l_{THP}$ in the secondary scanning direction which is perpendicular to a direction in which the resistors are arranged, and aventurine-like portions are printed. As can be seen from FIG. 2(b), here is described the process in case that p=2. Further, as can be seen from FIG. 2(c), each of the energizing periods such as $t_{11}(1)$ is less than each of the energizing periods such as $t_{11}$ of FIG. 7(c).

Figure 1:
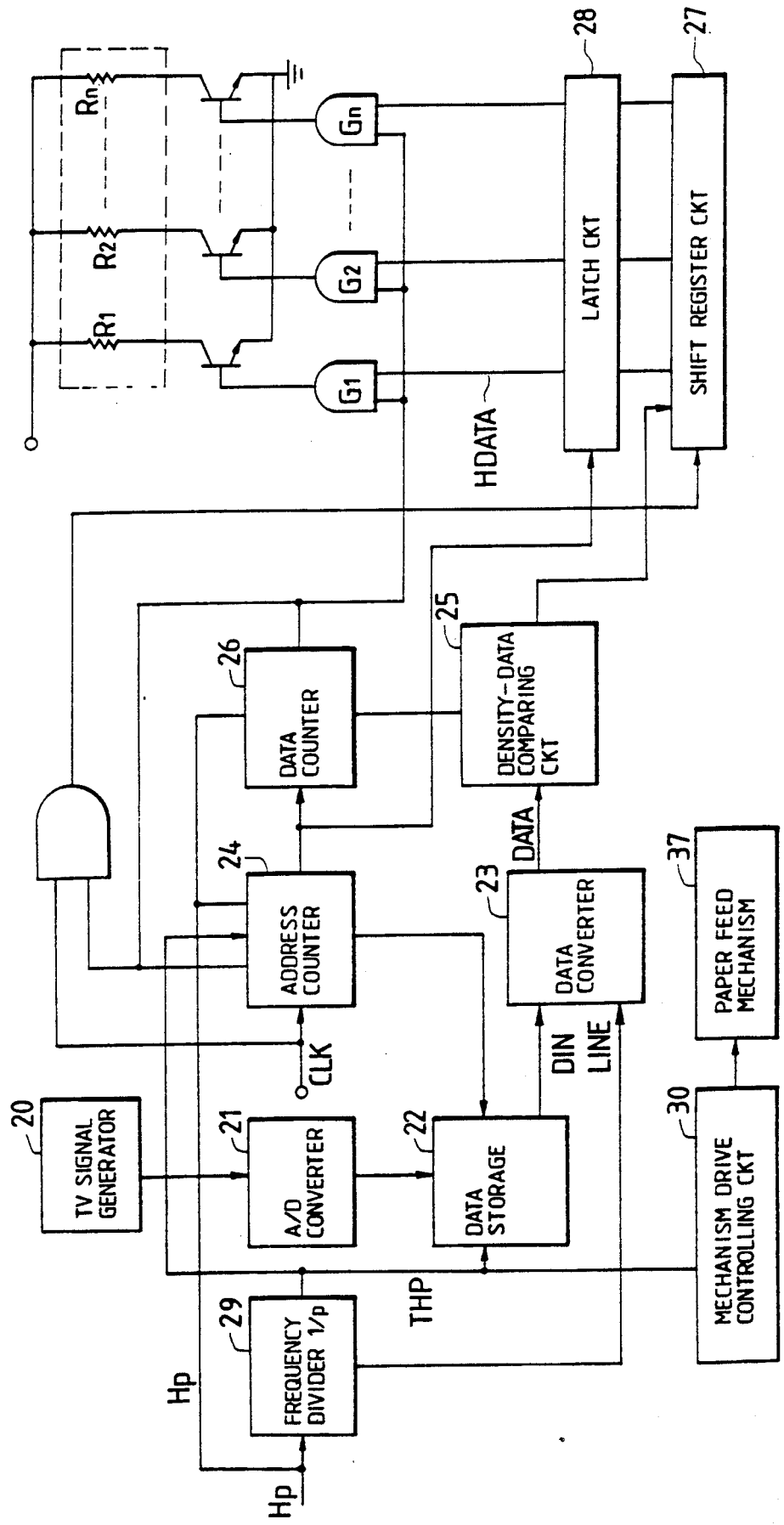
FIG. 1 is a schematic block diagram for showing the construction of the density controlling device of the thermal dye transfer printing apparatus embodying the present invention.

FIG. 1 is a schematic block diagram for showing the construction of the density controlling device of the thermal dye transfer printing apparatus embodying the present invention. In this figure, reference numeral 20 indicates a television (TV) signal generator; 21 an analog-to-digital (A/D) converter; 22 a data storage device; 23 a data converter; 24 an address counter; 25 a density-data comparing circuit; 26 a data counter; 27 a shift register; 28 a latch circuit; 29 a frequency divider; 30 a mechanism drive controlling circuit; and 37 a paper feed mechanism.

Figure 8A:
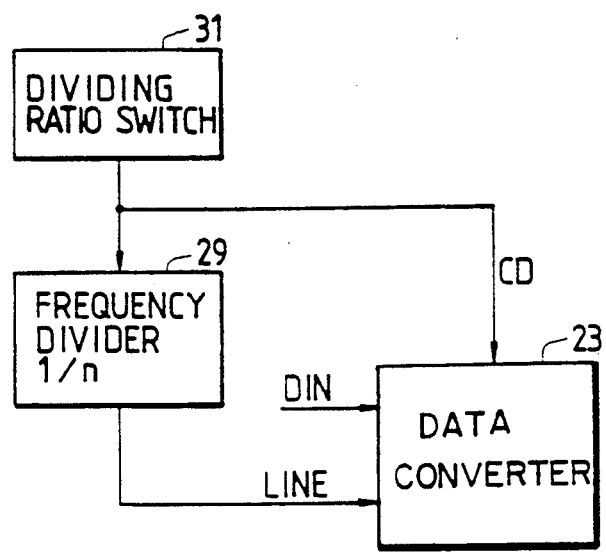
FIG. 8(a) is a schematic block diagram for showing the construction of the apparatus for manually setting the dividing ratio 1/n of a frequency divider.
Figure 8B:
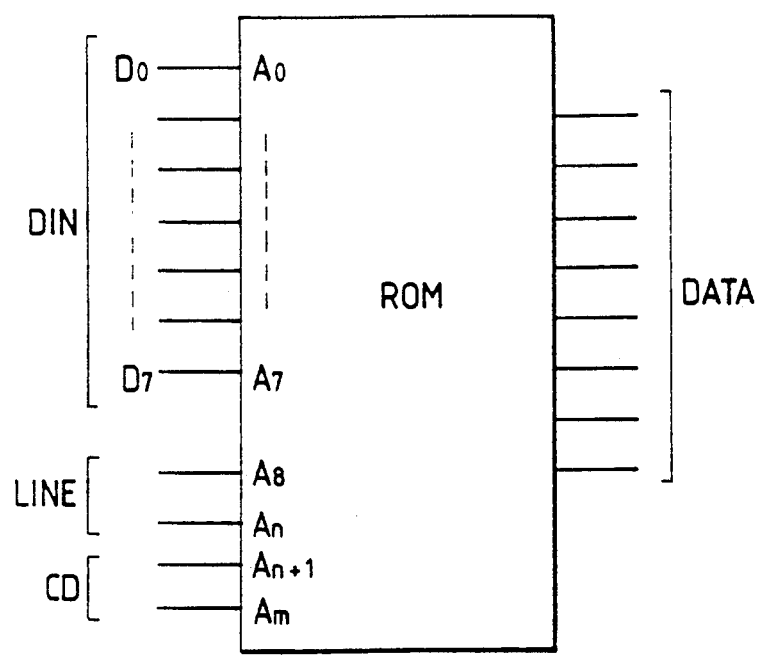
FIG. 8(b) is a diagram for showing the construction of a data converter.

Hereinafter, an operation of this device in case that a divisor of the data printing pitch, namely, the integer p equals 2 will be described in detail by referring to a timing chart shown in FIG. 3. Further, in FIGS. 1 and 3, reference characters HP indicates a printing timing signal; and THP a signal (hereunder referred to simply as a pitch signal) of which the period corresponds to that required to print one data. The signal HP is inputted to the frequency divider 29, of which the ratio 1/p (hereunder referred to as a dividing ratio) of the frequency of the output signal to that of the input signal is variable, and further the signal THP is outputted therefrom. Thus, in case of the divisor p, the frequency of the signal HP is set as p times as many as that of the printing timing signal used in the conventional thermal dye transfer printing apparatus. Incidentally, the dividing ratio 1/p of the frequency divider 29 is manually set by inputting a signal CD, which indicates data of the dividing ratio, from a dividing ratio switch 31 provided in the apparatus as shown in FIG. 8(a) to both of the frequency divider 29 and the data converter 23 which is constructed as shown in FIG. 8(b). Further, data indicated by input signals DIN and LINE, which will be explained hereinbelow, to a read-only memory (hereunder abbreviated as a ROM) of FIG. 8(b) are set as shown in FIG. 8(c).

Figure 9A:
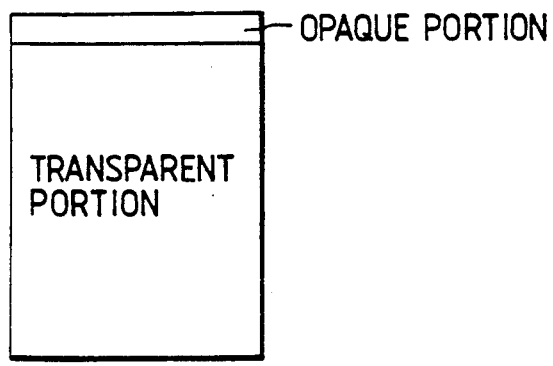
FIG. 9(a) is a diagram for showing a sheet of OHP paper.
Figure 9B:
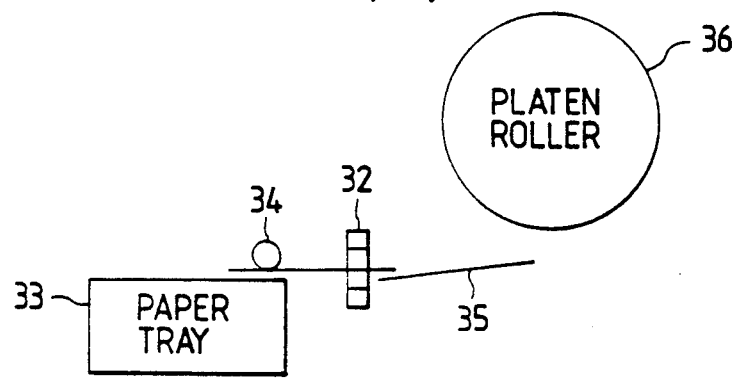
FIG. 9(b) is a diagram for showing an automatic setting system for automatically setting the dividing ratio 1/n of a frequency divider.
Figure 9C:
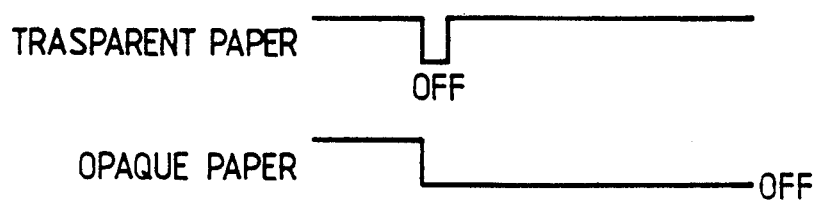
FIG. 9(c) is a timing chart for illustrating an operation of the system of FIG. 9(b)

Further, when a kind of paper such as OHP (overhead projector) paper, which is not so easy to print on as a common kind of paper, is used, an automatic setting of the dividing ratio can be performed by employing a cartridge as described in the Japanese Utility Model Application Provisional Publication No. 63-859 or employing the following system as shown in FIG. 9(b) in place of providing the switch 39 in the apparatus. First, as shown in FIG. 9(a), an opaque portion is provided at one edge of a transparent portion of such a kind of the paper like OHP paper. Further, as shown in FIG. 9(b), a paper sensing device 32 as shown in FIG. 9(a) is provided between a paper feeding roller 34 and a paper feeding guide 36 on a paper feeding path 35 to discriminate such a kind of paper. Further, in this figure, reference numeral 33 indicates a paper tray. That is, as is seen from FIG. 9(c), an output of the paper sensing device 32 in case of sensing a sheet of paper like the OHP paper having the opaque and transparent portions is different from an output thereof in case of sensing a sheet of the common kind of paper. Thus, it is apparent to those skilled in the art that data of the dividing ratio can be automatically selected and set in the frequency divider 29 in response to the output of the paper sensing device 32.

On the other hand, it is apparent to those skilled in the art that the value of the divisor p can be either fixed or variable in the apparatus of the present invention by a known method or device.

Moreover, the signal HP is also provided to the address counter 24 and to the data counter 26. Thus, an operation of reading data from the data storage device 22 and another operation of controlling the energizing of the resistors $R_1$, $R_2$, ... and $R_n$ are performed at the period as the same with that of the signal HP. Furthermore, an operation of writing data into the data storage device 22 is controlled by the signal THP. Thus, this controlling device is arranged such that one data to be printed on a specific line is read therefrom a plurality of times. Incidentally, a signal LINE connected to the data converter 23 is a code signal indicating a split line number.

In the controlling device of FIG. 1, first, analog video signals derived from the TV signal generator 20 for generating TV signals of a television (TV) camera, a video television recorder (VTR) and so on are converted by the A/D converter 21 into digital signals which are sent to the data storage device 22 such as a semiconductor storage device and are stored therein after determining their addresses of the number of necessary pixels. Thereafter, a starting pulse is applied to the address counter 24 and in addition a reference clock pulse (CLK) is also sent thereto. Then, information on the addresses of density data to be printed for the first time is sent to the data storage device 22 which sends the data corresponding to the addresses to the data converter 23, whereupon the data are converted by multiplying each of the densities by a constant value $\alpha$ which is set to be less than 1. The converted data are transferred to the density data comparing circuit 25 which is composed of a digital comparator. At that time, the value of the count or reference density level to be held in the data counter 26 is set as 1. Further, the data sent from the data storage device 22 are compared with the data or value 1 of the count sent from the data counter 26. If the data from the data storage device 22 is equal to or greater than the data 1 from the data counter 26, a signal indicating the value 1 of the count is issued by the circuit 25 to the shift register 27. Otherwise, a signal indicating a value 0 is issued therefrom to the shift register 27. Upon completion of counting the total number n of the resistors of the thermal head by the address counter 24, a first data-transferring pulse is sent to the latch circuit 28. At the same time, a heating pulse is sent to the gates $G_1$, $G_2$, ... $G_n$.

Furthermore, the count held in the data counter 26 is similarly incremented by 1 hereafter every time when the address counter 24 counts n. Further, assuming that the maximum density of a dot to be printed is m which is a positive integer, such counting operation as to each input density data is repeatedly effected by the address counter 24 m times. Then, every time the data at each address is sent from the data storage device 22, the value of the count held in the data counter 26 is compared with the data sent from the data storage device in the density data comparing circuit 25. If the data of an address is equal to or greater than the value of the count in the data counter 26, a signal indicating 0 to the shift register circuit 27. Further, when the address counter 24 finishes counting the total number n of the resistors $R_1$, $R_2$, ... and $R_n$ of the thermal head, a data transferring pulse is sent to the latch circuit 28. Simultaneously with this, a heating pulse is sent to the gates $G_1$, $G_2$, ... $G_n$. In this way, if the maximum density of the data of the address counter 24 is m, electric current is continuously applied to the resistors of the thermal head for a heating period $\alpha$ T of time (a period T of time is the maximum period of time during the resistors are heated in case of the conventional apparatus which does not shift the thermal head by a pitch obtained by dividing a data printing pitch $1_{THP}$ at the time of printing dots) and thereby dots, of which the maximum density is $\alpha m$, are printed on the sheet of paper. Thus, the electric current corresponding to the energizing pulse HDATA continuously flows through the resistors $R_1$, $R_2$, ... and $R_n$ for a period of time of which the length is proportional to $\alpha T/m$. Thereby, the gradational printing corresponding to the value of the number indicated by the address counter 24 can be achieved. The number indicated by the address counter 24 is m, the period of time during the paper is heated by the resistors of the thermal head reaches $\alpha T$ with result that the electric current is applied to the resistors of the thermal head for the period of time required to the maximum extent of heating and that the gradational printing can be carried out.

Further, in case where the divisor is p, an operation of printing one data is completed by repeating an operation similar to the above described process p times, that is, continuously feeding the paper by an amount of $1_{THP}/p$ ($=1_{HP}$) every period of the signal HP in the secondary scanning direction by means of the mechanism drive controlling unit 30 and the paper feed mechanism 37 and printing separately p split lines.

The data converting circuit 23 is a circuit for setting the density of a dot as lower than the density of a dot printed by the conventional apparatus by printing p dots corresponding to one input data indicated by an input signal DIN thereto with the lower density which is set by multiplying each of the density of the one input data by a constant value $\alpha$ which is less than 1. A signal DATA indicates the data obtained by thus converting that indicated by the signal DIN and is repeatedly outputted p times at the period of the signal HP.

Figure 4:
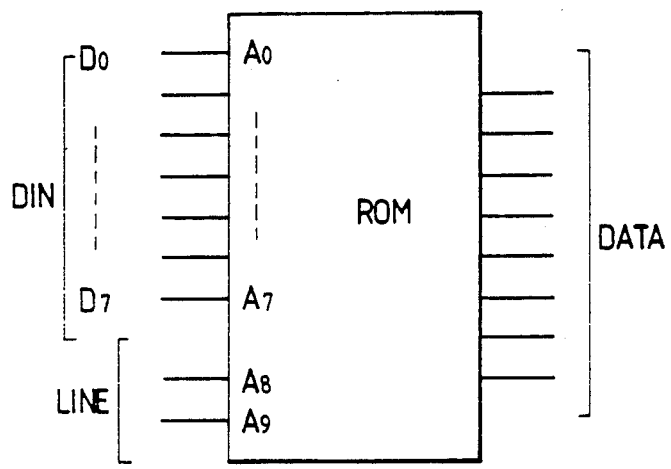
FIG. 4 is a diagram for showing an example of a data conversion circuit.

FIG. 4 is a diagram for showing an example of the data converting circuit 23 which effects the division of the density of the one data corresponding to a dot printed by the conventional apparatus on a line and can freely change the energizing period between the sum of the widths of two pulses HDATA2 and that of the widths of two pulses HDATA4. Further, as can be understood from the foregoing description, the value of the divisor p can be freely selected in accordance with the number of bits used to represent data indicated by the signal LINE.

Figure 5A:
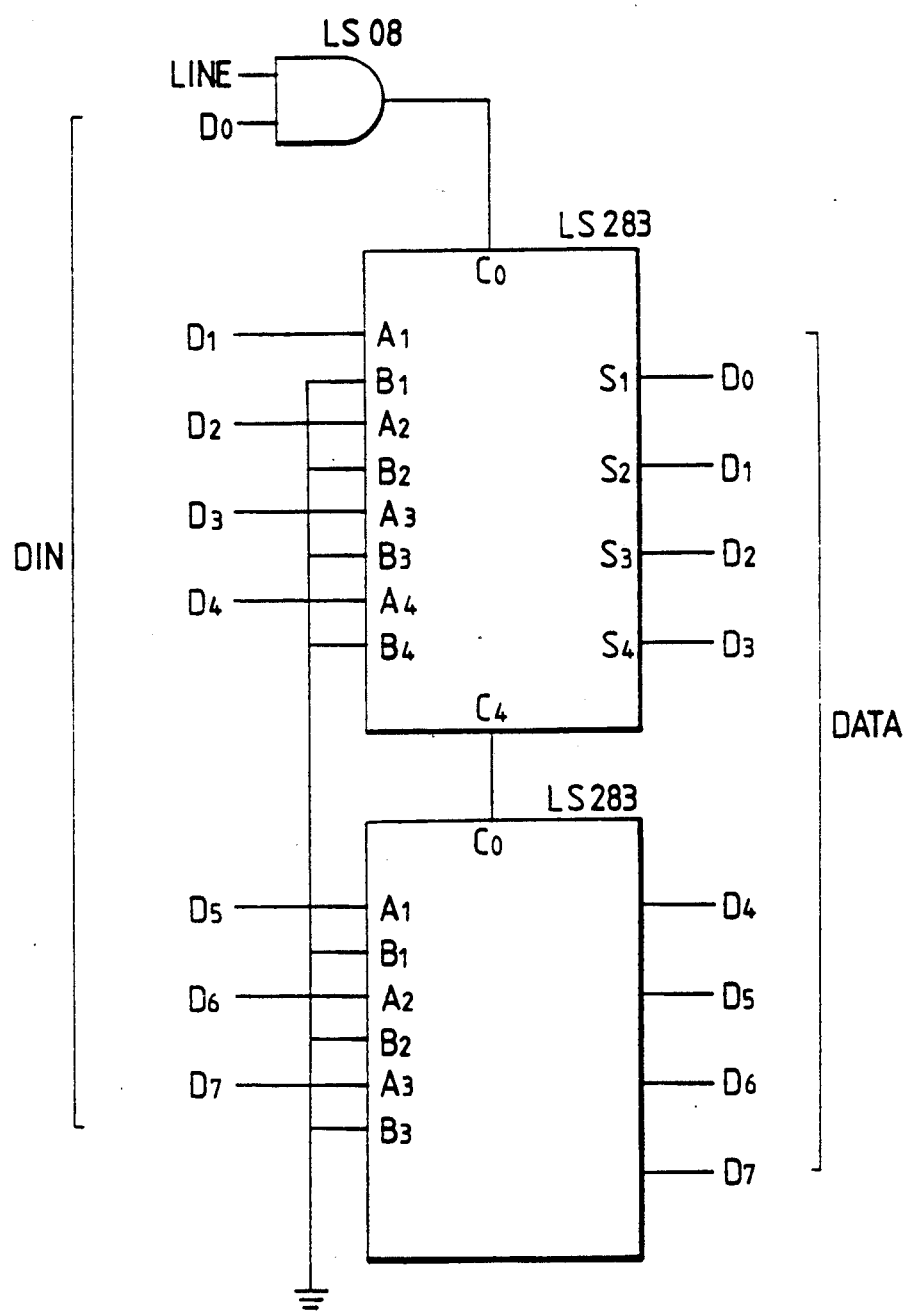
FIG. 5(a) is a diagram for showing another example of a data conversion circuit.
Figure 5B:
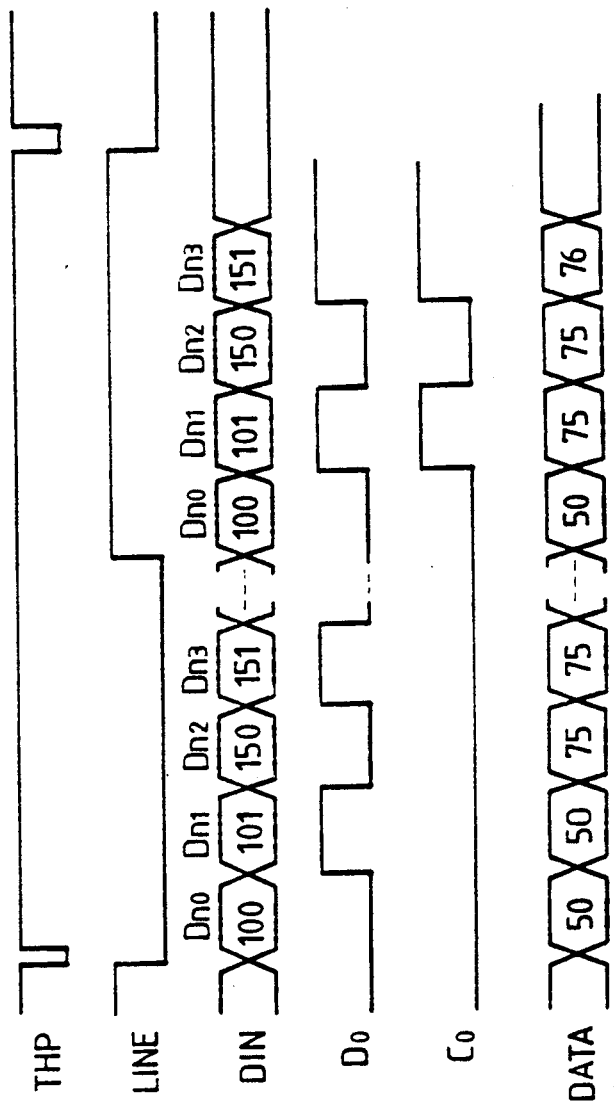
FIG. 5(b) is a timing chart for illustrating an operation of the circuit of FIG. 5(a)

FIG. 5 (a) is a circuit diagram showing an example of the data converting circuit 23 in case of employing the signal HDATA2, that is, in case that the density of a dot to be printed by the conventional apparatus is divided into two smaller densities of dots each having a smaller width to be printed by the device of the present invention and the divisor p used for dividing a data printing pitch $1_{THP}$ is 2. In this figure, reference characters LS08 and LS283 indicate an AND-gate and an adder, respectively. This example of the data converting circuit 23 can effect the converting operation at higher speed than the example of FIG. 4 does. Further, all of each divided data, that is, the contents of the most significant bit to the least significant bit of the data divided by two are fetched by this example of the data converting circuit 23 without omission of the quantity of the data divided by 2 represented by 8 bits. Next, an operation of this example will be described with reference to FIG. 5 (b). As can be seen from this figure, the signal DIN corresponds to the signal HP of FIG. 3 and further the same data $D_{n0}$, $D_{n1}$, $D_{n2}$, $D_{n3}$ . . . are repeatedly inputted to the data converter 23 of FIG. 5 (a) at the same period of the signal THP. At that time, the signal LINE is inputted through one terminal of the AND-gate LS08 and on the other hand a signal representing the least significant bit $D_0$ is inputted through the other terminal thereof. When the signal LINE indicates 0, the value at the least significant bit $C_0$ of the input data to the adder LS283 is 0 and thus the decimal part of (DIN/2) is omitted. On the other hand, when the signal LINE indicates 1, the value at the bit $D_0$ is inputted to the terminal $C_0$ and further the fraction or decimal part of (DIN/2) is counted as 1. As a result, the data as shown in FIG. 8 (c) (especially, in case where the divisor indicated by the signal CD equals 2) are obtained.

Incidentally, a signal HDATA1 indicates an energizing control data used in the conventional apparatus in which the data conversion of the apparatus according to the present invention is not performed. Further, the signals (hereunder sometimes referred to as energizing control data signals) HDATA2, HDATA3 and HDATA4 indicate examples of the energizing control data used in the apparatus pursuant to the present invention in case where the divisor p equals 2. The signal HDATA2 is used in case where dots corresponding to density data (128 and 127) obtained by dividing input data (255) by 2 are printed at the positions at which the thermal head is shifted by a pitch obtained by dividing the one-data printing pitch $1_{THP}$ by 2. Further, the sum of the densities of the dots obtained by dividing the density of the input data may be not necessarily equal to the density of the input data. That is, it is possible that the densities (128 and 127) of the data indicated by the signal HDATA2 as obtained by dividing the density of the input data by 2 is increased to those (192 and 191) of the data indicated by the signal HDATA3 and thereby the ratio of a period of energizing the resistors of the thermal head to a period of deenergizing the resistors, that is, the ratio of an ON part of the energizing control data signal to an OFF part thereof can be made high. Furthermore, in case where the density of the input data is not divided by an integer, for example, 2 and is not the maximum density, dots of the same density can be printed over the range of two printing pitches.

Further, the timing signal HP is generated by the combination of an optical sensor and an encoder provided to a platen roller driving motor described in the Japanese Patent Application Provisional Publication No. 61-154959. By using this signal HP, the driving of the thermal head can be controlled in the same manner as in the conventional apparatus.

Figure 6A:
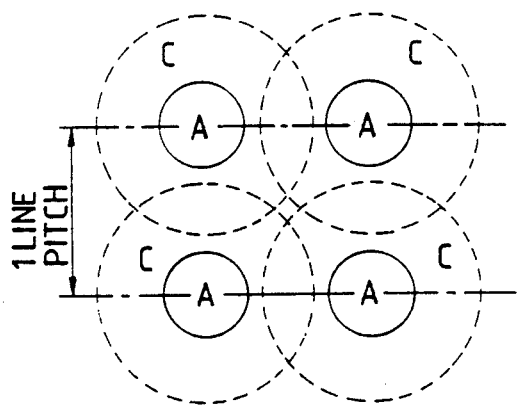
FIG. 6(a) is a diagram for showing printed dots on a sheet of recording paper in case of the conventional method.
Figure 6B:
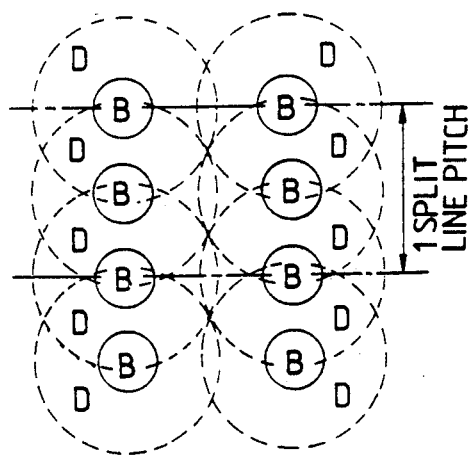
FIG. 6(b) is a diagram for showing dots printed by the method of the present invention.

FIG. 6 (a) shows printed dots on a sheet of recording paper in case of the conventional method using the signal HDATA1; and FIG. 6 (b) dots printed by the method of the present invention using the signal HDATA2 or HDATA3. In these figures, reference characters A and B indicate portions of high density; and reference characters C and D portions of low density.

In case of the conventional method as shown in FIG. 6 (a), the period of energizing the registers of the thermal head is longer than the other case of FIG. 6 (b) and thus the diameter of the printed dots is larger than the latter case of FIG. 6 (b). Generally, the distribution in temperature of the surface of the resistor of the thermal head is shaped like a hanging bell. Namely, the closer the position reaches the center of the resistor, the higher the temperature becomes. Thus, each of the printed dots has a portion C of low density in the peripheral portion thereof. For simplicity of drawing, the borders of the printed dots are drawn in these figures. In fact, the border of each printed dot is not so clear as drawn in these figures. However, in the peripheral portion C of low density, two contiguous printed dots are partially overlapped with each other, thereby maintaining the density to a certain extent. In case of the present invention as shown in FIG. 6 (b), the quantity of electric current flowing the resistors of the thermal head for energizing the resistors per dot is less than in the conventional case of FIG. 6 (a). Further, in case of the present invention, the diameter of printed dots is smaller than that of the dots in the conventional case. However, in comparison with the conventional case of FIG. 6 (a), the overlapped area of the peripheral portions D of low density is larger than in case of the conventional case of FIG. 6 (a) and thus the printing of dots can be performed at a relatively uniform density thereof. Therefore, in case of the present invention of FIG. 6 (b), even when the data of high density are printed, portions of high temperature are not centralized on the surface of each of the resistor and further the surface of a sheet of the paper is not so degraded as in the conventional case of FIG. 6 (a). Further, as described above, the densities obtained by dividing the input data by any integer are set to be practically equal in case of the present invention. The portions D of low density are most efficiently overlapped and in addition the density of dots are made substantially uniform thereby making individual dots indistinguishable from each other.

Figure 10:
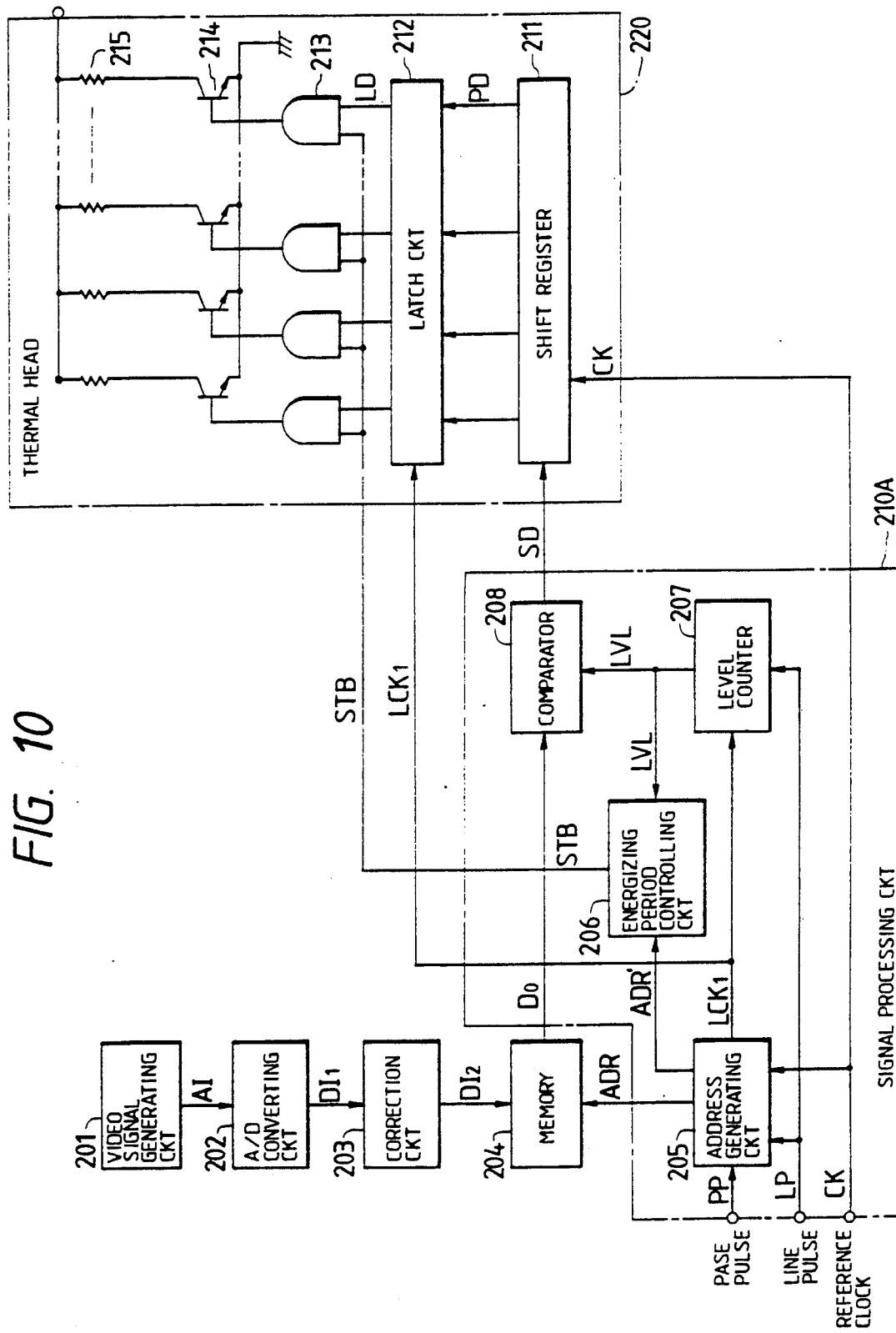
FIG. 10 is a schematic block diagram for showing the construction of an embodiment of the present invention.

Next, FIG. 10 is a schematic block diagram for showing the construction of a thermal printing apparatus embodying the present invention.

As shown in this figure, this apparatus includes a video signal generating circuit 201, an analog-to-digital (A/D) converting circuit 202, a correction circuit 203, a signal processing circuit 210A and a thermal head 220.

The video signal generating circuit 201 outputs a video signal AI of a frame in a television. Further, this signal AI is converted into a digital signal $DI_1$ by the A/D converting circuit 202. Moreover, the signal $DI_1$ is used as a signal indicating input data to the apparatus of the present invention. The correction circuit 203 includes a read-only memory (ROM) and converts this input data into printing data and outputs a signal $DI_2$ indicating the printing data.

The memory 204 accepts the signal $DI_2$ and includes a random access memory (RAM) for storing the printing data of at least 1 line, preferably, 1 frame.

The signal processing circuit 210A is composed of an address generating circuit 205, an energizing period controlling circuit 206, a level counter 207 and a comparator 208. The address generating circuit 205 is composed of gates and counters and outputs a signal ADR indicating addresses for writing and reading of the printing data to the memory 204. A "page pulse" PP to be inputted every time of commencing the printing of data of which the amount is 1 page, a "line pulse" LP to be inputted every time of commencing the printing of data of which the amount is 1 line, a reference clock CK are inputted to this address generating circuit 205. Further, a signal ADR′ indicating addresses of the printing data in the primary scanning direction is outputted to the energizing period controlling circuit 206. A latch pulse $LCK_1$ is outputted to the level counter 207 and the thermal head 220 when the addresses indicated by the signal ADR′ correspond to the total number of resistors.

Figure 11:
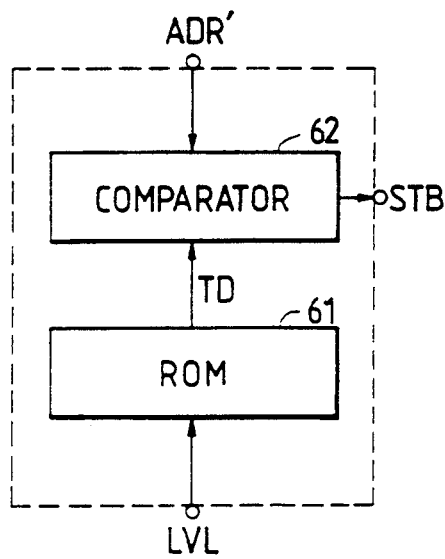
FIG. 11 is a block diagram for showing the construction of an energizing period controlling circuit of FIG. 10.

The energizing period controlling circuit 206 is composed of a read-only memory (ROM) 261 and a comparator 262 as shown in FIG. 11.

Figure 22:
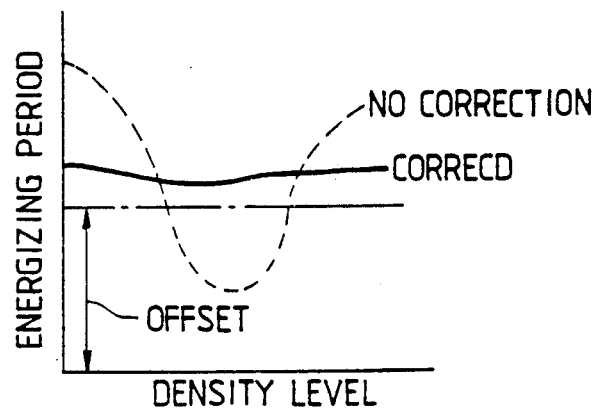
FIG. 22 is a graph showing the corresponding relation between the periods of energizing the resistors and the density levels.
Figure 23:
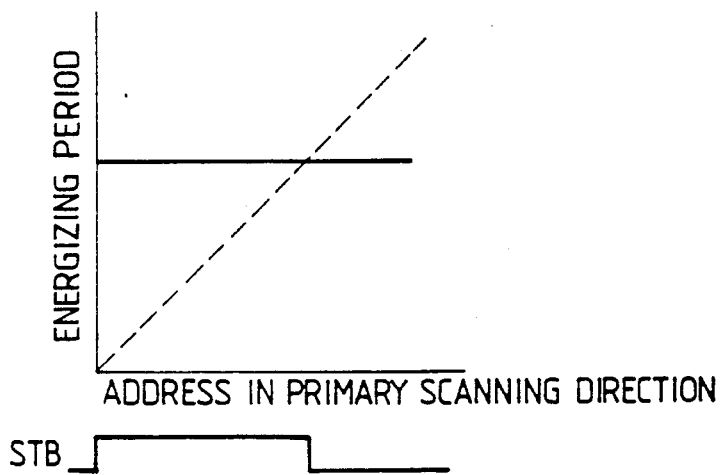
FIG. 23 is a diagram for illustrating an operation of the comparator of the circuit of FIG. 11.

In the circuit 206, the ROM 261 outputs a control signal TD for controlling the increment of the period of energizing the resistors of the thermal head to the comparator 262 in response to the level signal LVL indicating the density level. The corresponding relation between the periods of energizing the resistors indicated by the signal TD and the density levels indicated by the signal LVL is shown in a graph of FIG. 22. In this figure, a curve drawn by a solid line indicates the periods of energizing the resistor corresponding to the density level in case of the present invention and on the other hand a curve drawn by a dotted line indicates the periods of energizing the resistors in case of the conventional apparatus in which the correction circuit 203 is not provided. As can be seen from this figure, in case of the conventional apparatus, the difference between the periods (hereunder referred to as the energizing periods) of energizing the resistors corresponding to the ranges of low and high density level and those of energizing the resistors corresponding to the range of intermediate density level is large and thus a relatively large quantity of data is needed. In contrast, the differences between the energizing periods corresponding to the ranges of low and high density levels and those corresponding to the range of intermediate density level is small in case of the apparatus of the present invention provided with the correction circuit 203. Therefore, by cancelling an offset by a known method, the number bits of the comparator and the ROM can be substantially reduced. Further, the control signal TD is received by the comparator 262 and compared with the address signal ADR′ therein. If the value indicated by the signal TD is larger than that indicated by the signal ADR′ (refer to FIG. 23), the comparator 262 outputs a strobe signal STB. Thus, the longer the energizing period indicated by the signal TD becomes, the larger the width of the energizing pulse becomes.

Turning now to FIG. 10, the level counter 207 is reset by the line pulse LP and counts latch pulses outputted form the address generating circuit 205 and outputs the density level signal LVL.

The comparator 208 compares the density level indicated by the signal LVL with the printing data $D_0$ and outputs the signal SD for controlling turning on and off of the resistors for emitting heat.

The thermal head 220 comprises a shift register 211, a latch circuit 212, AND-gates 213, switching transistors 214 and heat emitting elements 215 (hereunder sometimes referred to simply as resistors) such as resistors.

A control signal SD for selectively turning on and off the group of resistors 215 is inputted serially into the shift registers 211 in synchronization with the reference clocks CK. The shift registers 211 serially converts this signal into a parallel signal PD corresponding to the address of each of the resistors. The latch circuit 212 latches the parallel signal PD in response to a latch signal $LCK_1$. When the strobe signal STB is inputted into the group of the AND-gates 213, the group of the switching transistors 214 are selectively turned on or off in response to the signal latched by the latch circuit 212 and the corresponding resistors 215 are selectively energized.

The construction of this thermal head is the same with that of the conventional one.

An operation of the thus constructed apparatus will be described hereinbelow.

First, an analog video signal AI outputted from the video signal generating circuit 201 is converted in the A/D converting circuit 202 into input data signal $DI_1$ representing input data in the digital form. The input data indicates the densities of pixels of an image to be printed, each of which is represented by 8 bits, that is, by selecting one of 256 integers ranged from 0 to 255.

Figure 21:
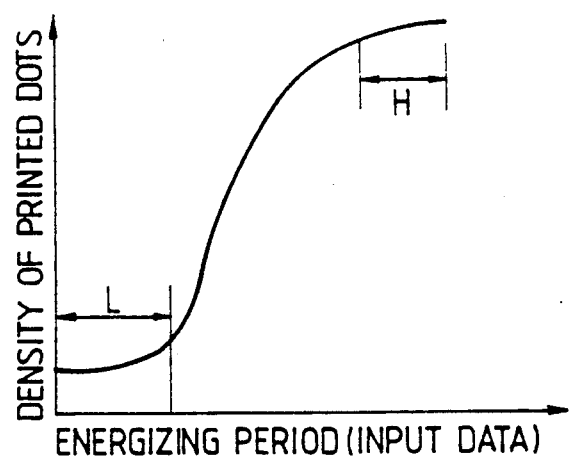
FIG. 21 is a graph showing the relation between the energizing period of energizing the resistor of the thermal head and the actual density of printed dots in case of the conventional apparatus.

The correction circuit 203 receives this signal and outputs printing data $DI_2$. As previously described with reference to FIG. 21, if the level of the input data $DI_1$ to be printed is set to be proportional to the corresponding energizing period as in the prior art, the actual density of the printed characters or figures are not linearly proportional to that of the input data. This correction circuit 3 converting the input data $DI_1$ such that the actual densities of the printed characters or figures are substantially linearly proportional to the printing data $DI_2$.

Figure 12:
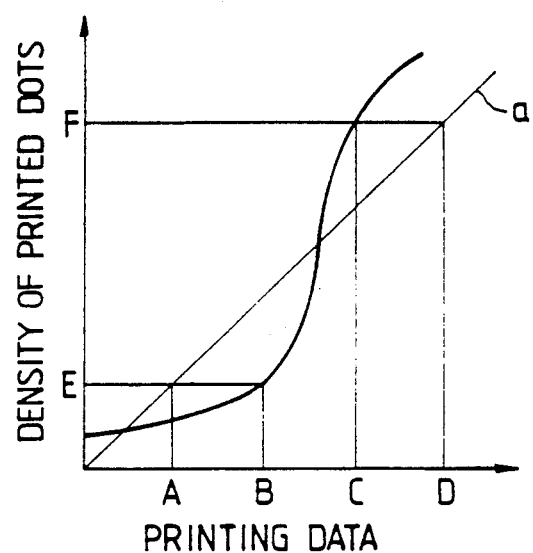
FIG. 12 is a graph for illustrating a concrete example of an operation of the data converting circuit of FIG. 10.

FIG. 12 is a graph for illustrating a concrete example of such a converting operation.

The abscissa and the ordinate of this graph represent the printing data and the actual densities of the printed characters, respectively. In this graph, a line "a" indicates a preferable case in which the printing data are substantially linearly proportional to the actual densities of the printed characters or figures.

Here, it is now assumed that a preferable density of the printed character corresponding to the input data A is E. Practically, the input data required to obtain the actual density E of the printed character is B.

Figure 24:
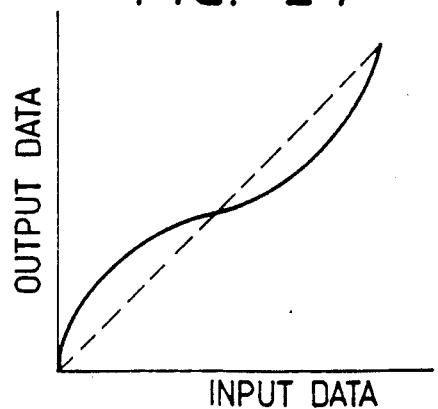
FIG. 24 is a graph showing the relation between the printing data outputted from and the input data inputted into a data correction circuit.

Thus, the correction circuit 203 of FIG. 10 converts the input data A into the input data B as the printing data and then outputs the thus obtained printing data to the memory 204. Further, as is seen from FIG. 12, if the input data is D, a preferable density of the printed character is F. Practically, it is, however, C that is required to obtain the actual density F of the printed character. Thus, the correction circuit 203 of FIG. 10 converts input data D into data C as the printing data and outputs this printing dot to the memory 204. FIG. 24 is a graph showing the relation between the printing data $DI_2$ thus outputted from and the input data $DI_1$ inputted into the correction circuit 203. In this figure, a solid curve indicates such preferable relation between the data $DI_1$ and $DI_2$ and a dotted line indicates the relation between the data $DI_1$ and $DI_2$ in case of no correction. The correction circuit 203 includes a ROM storing a table obtained by tabulating the preferable relation between the data $DI_1$ and $DI_2$ shown in FIG. 24.

Turning to FIG. 10, the printing data $DI_2$ of, for example, 1 frame of the image outputted from the correction circuit 203 are preliminarily stored in the memory 204. When the printing operation is started, the address ADR from the address generating circuit 205 is inputted to the memory 204 and then a printing data signal $D_0$ is read out thereof. At the same time, the density level signal LVL outputted from the level counter 207 reset by the the line pulse LP is inputted to the comparator 208 and then is compared with the printing data signal $D_0$ therein. Further, if data indicated by the signal $D_0$ is greater than the level indicated by the signal LVL, an output signal SD indicates "1" (corresponding to a high level thereof). In other cases, the output signal SD of the comparator 208 indicates "0" (corresponding to a low level thereof). When the output signal SD has a high level, a corresponding resistor is energized. In contrast, when the signal SD has a low level, the corresponding resistor is not energized.

The data indicated by the output signal SD of the comparator 208, the number of which is that of the resistors of the thermal head, are stored in the shift register 211 in synchronization with the reference clock CK. Then, the output signals PD of the shift register 211 are latched by the latch circuit 212 in response to the latch pulse $LCK_1$. Subsequently, in the manner as described, the group of the transistors 214 are selectively turned on and further the group of the resistors 215 selectively emit heat.

The above described operation is repeatedly effected with the level counter 207 counting the latch pulses $LCK_1$.

In case of this embodiment, the same comparing operation of the comparator 208 is repeatedly effected with reference to each of 256 levels indicated by the signal LVL outputted by the level counter 207. That is, the printing data corresponding to a resistor is subsequently compared with the data indicated by the signal LVL in the comparator 208. Thus, the corresponding resistor is kept energized until the data indicated by the signal LVL becomes equal to the value of the printing data and thereafter the energizing of the resistor is stopped. Thereby, the corresponding resistor emits heat for a period of time corresponding to the value of the printing data.

Further, at each level of the density, a strobe signal STB of which the pulse width corresponds to the level of the density, is supplied from the energizing period controlling circuit 206 to the group of the AND-gates 213. Moreover, the pulse widths of the strobe signal STB each corresponding to different one of levels of the density, that is, the increments of the energizing period corresponding to the increments of the level of the density are determined under preliminarily set conditions.

In this embodiment, the printing data, which are substantially linear proportional to the actual density of a printed character, are obtained in the correction circuit 203 and outputted therefrom to the signal processing circuit 210A. Thereby, there is no need of widely changing the increment of the energizing period in the energizing period controlling circuit 206.

Thus, in designing the energizing period controlling circuit, the optimum relation between the printing data and the input data can be relatively easily determined and moreover the number of bits of corrected data of the energizing period can be small. Consequently, in accordance with the present invention, the configuration of the circuit of the apparatus can be relatively simplified.

Figure 13:
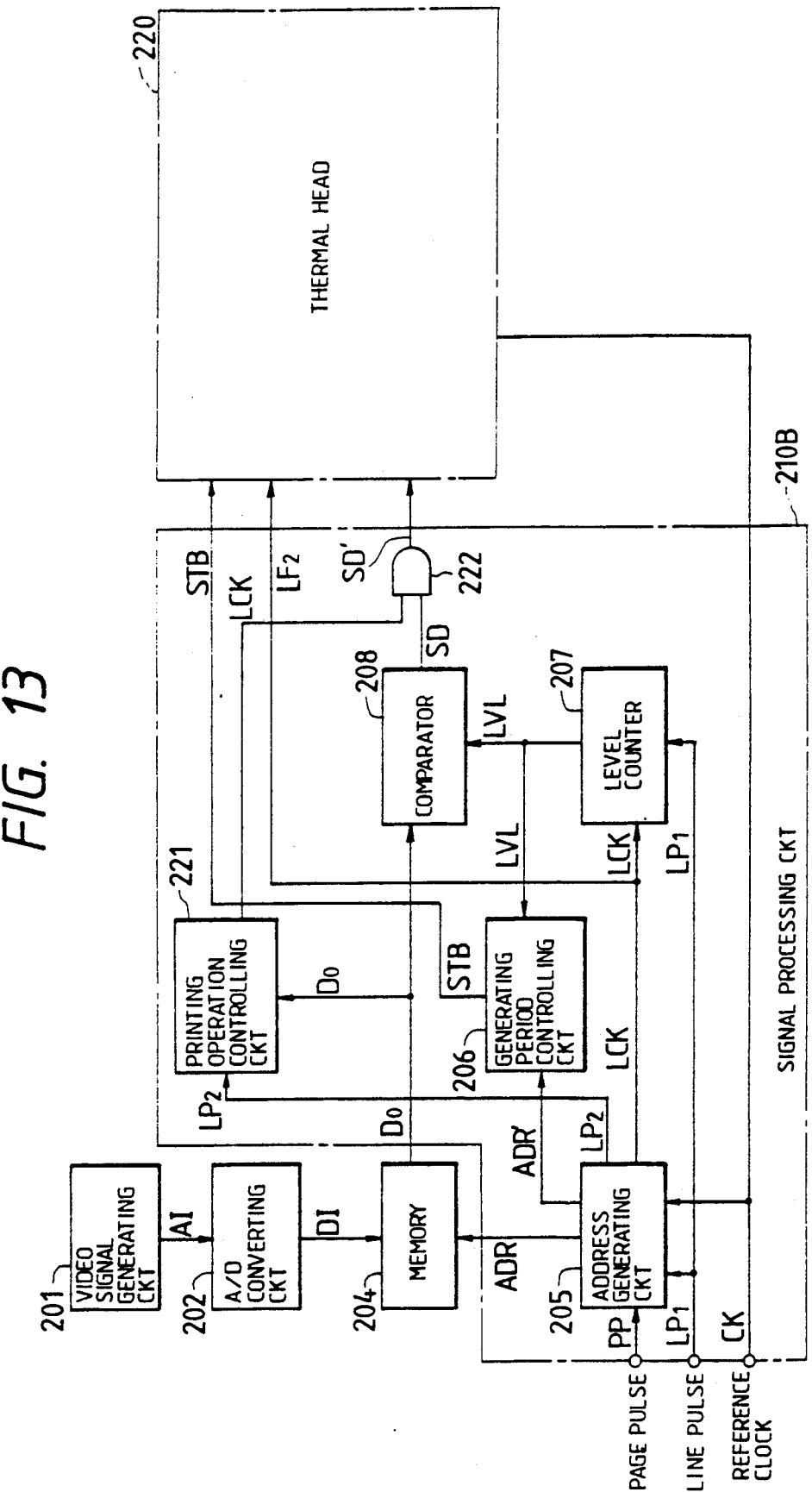
FIG. 13 is a schematic block diagram for showing another embodiment of the present invention.

FIG. 13 is a schematic block diagram for showing another thermal printing apparatus embodying the present invention.

Differently with the embodiment of FIG. 10, the embodiment of FIG. 13 is not provided with a correction circuit as provided in the embodiment of FIG. 10. Further, in a signal processing circuit 210B of FIG. 13, a printing control circuit 221 and an AND-gate 222 is provided, which are not included in the embodiment of FIG. 10.

Furthermore, a "line pulse" $LP_1$ inputted to the address generating circuit 205 of this signal processing circuit 210A is periodically outputted every time when the paper to be printed by the thermal head 220 is continuously moved in the secondary scanning direction perpendicular to the thermal head 220 by half of the distance D between the contiguous resistor of the thermal head 220. Further, another "line pulse" $LP_2$ is supplied from the address generating circuit 205 to the printing control circuit 221. The line pulse $LP_2$ is repeatedly inverted in synchronization with the line pulse $LP_1$. When a "page pulse" PP is inputted into the address generating circuit 205, the level of the line pulse $LP_2$ becomes high. In synchronization with this line pulse $LP_2$, the address generating circuit 205 counts addresses in the primary scanning direction.

Figure 14:
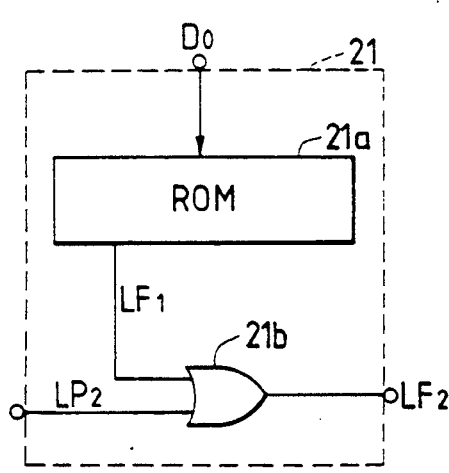
FIG. 14 is a block diagram for showing the construction of the printing control circuit which comprises a read-only memory (ROM) and an OR-gate.

FIG. 14 is a detail block diagram for showing the construction of the printing control circuit 221 which comprises a read-only memory (ROM) 221a and an OR-gate 221b.

Figure 25:
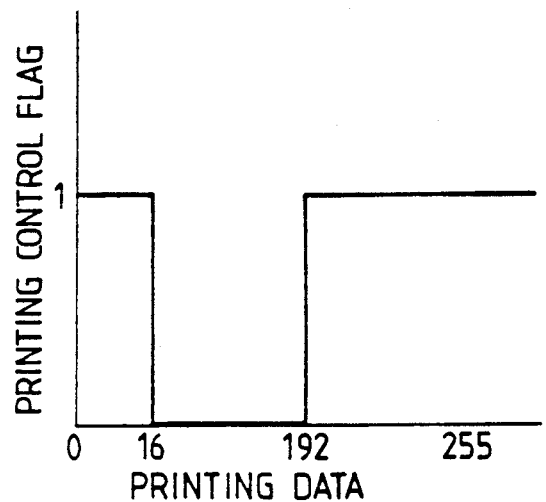
FIG. 25 is a diagram for showing the relation between printing data and a printing control flag.

The printing data signal $D_0$ read out of the memory 204 is inputted to the ROM 221a which outputs a signal $LF_1$ indicating a printing control flag represented by 1 bit in response to the signal $D_0$ as shown in FIG. 25. The signal $LF_1$ outputted from the ROM 221a and the line pulse $LP_2$ outputted from the address generating circuit address generating circuit 205 are connected to the OR-gate 221b. The output $LF_2$ of the OR-gate 221b is inputted to a terminal of the AND-gate 222 shown in FIG. 13. When the level of the signal $LF_1$ is high (that is, "1"), the printing data is transferred to the thermal head 220 to increase the density of a printed character, even if the level of the line pulse $LP_2$ is low (that is, "0"). Except for the above described points, the structure and functions of each circuit block of FIG. 13 are the same as of corresponding circuit block of FIG. 10 and will not be described here.

Figure 15:
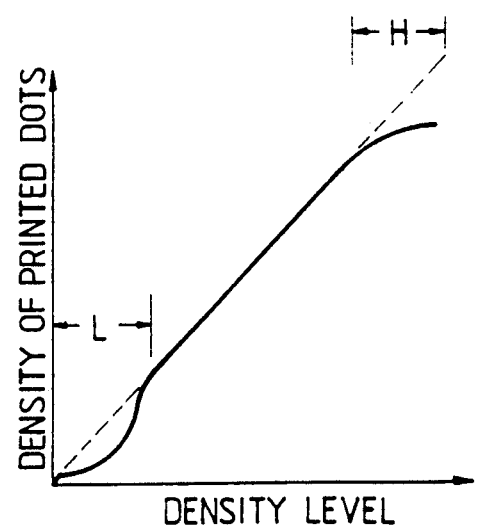
FIG. 15 is a graph for showing the relation between the density of the input data and the actual density of data printed on the paper.

Next, FIG. 15 is a graph for showing the relation between the density of the input data and the actual density of data printed on the paper. As shown in this figure, if only the energizing period controlling circuit 206 as described with reference to FIG. 10 is used, the relation between the density indicated by the input data and that of the actually printed data cannot be linear in the region H in which the level of the density is high and also in the region in which the level of the density is low. Further, as the speed of printing characters is increased, it is more difficult to obtain sufficient level of the density of the actually printed characters.

However, in case of the embodiment of the present invention shown in FIG. 13, the actual density of the printed character or figure is linearly proportional to the level of the density of the printing data even in the regions L and H.

FIGS. 16(a) and 16(b) are enlarged views of the arrangement of printed dots.

Hereinafter, a concrete operation of this embodiment of the present invention will be described in detail by referring to FIGS. 13, 14 and 16.

First, when input data of one line are inputted to the memory 204, the address signal ADR is outputted from the address generating circuit 205 and the stored input data are read out from the memory 204. Further, when the input data are inputted to the comparator 208, the density level signal LVL is inputted thereto at the same time and is compared with the input data. A signal SD indicating the result of the comparison is outputted from the comparator 208 and is stored in the shift register 211 of the thermal head 220 by way of the AND-gate 222. Similarly as in case of the embodiment of FIG. 10, the energizing period controlling circuit 206 outputs the predetermined strobe signals STB each corresponding to different one level of the density to the thermal head 220 in order to energize the corresponding resistor for a predetermined period corresponding to the actual density of the printed dot.

In this embodiment, the ROM 221a shown in FIG. 14 changes the signal $LF_1$ to be outputted to the OR-gate 221b in accordance with the printing data $D_0$ to be read out of the memory 204. On the other hand, the line pulse $LP_2$, which is repeatedly inverted in synchronization with the line pulse $LP_1$, is inputted to the OR-gate 221b. When the output signal $LF_1$ of the ROM 221a stands at a low level, the line pulse $LP_2$ is inputted as it is to the AND-gate 222 shown in FIG. 13 to open or close the gate 222 whereby the period of printing dots corresponds to that of the signal $LP_2$. Thereby, the characters or figures can be printed in the same manner as in case of the conventional method or apparatus. Namely, as shown in FIG. 16(a), a pitch $P_y$ for printing dots in the secondary scanning direction is almost equal to a pitch $P_x$ for printing dots in the primary scanning direction. The thus printed image is similar to that obtained by the conventional method.

In contrast, when the output signal $LF_1$ of the ROM 221a stands at a high level, the signal $LF_2$ also stands at a high level. Thus, the AND-gate 222 opens in spite of the line pulse $LP_2$. As a result of this, the output signal SD of the comparator 208 is sent to the shift register 211 at each line and the period of printing dots is equal to that of the signal $LP_1$. Thus, the pitch $P_y$ of printing dots in the secondary scanning direction equals half of the pitch $P_x$ of printing dots in the primary scanning direction, if $P_x=D$, $P_y=D/2$. By setting the output signal $LF_1$ of the ROM 221a in response to the printing data signal $D_0$ in this way, the density of printed dots on the surface of the paper can be twice that of dots printed by the conventional method with respect to the printing data indicated by the signal $D_0$. Thus, for example, in case that the density of dots are ranged from 0 to 255, the ROM 221a of the printing control circuit 21 outputs a signal indicating the density of high level to the OR-gate 221b if the density indicated by the printing data are in the low density region of which the level is ranged from 0 to 15 or the high density region of which the level is ranged from 192 to 255. Further, if the density indicated by the printing data are within the remaining range of levels, the ROM 221a of the printing control circuit 221 outputs a signal indicating the density of low level to the OR-gate 221b.

By the above described operation of this embodiment, the density of dots arranged as shown in FIG. 16(b), which are made by printing the printing data of low density level or high density level, can be increased in comparison with the density of printed dots in case of the conventional method as shown in FIG. 16(a), thereby obtaining sufficient density of printed dots in the area to be printed.

Further, FIG. 17 is a timing chart for illustrating an operation of this embodiment.

As shown in FIG. 17(a), the density indicated by the signal LVL to be inputted to the comparator 208 is incremented from 0 to 255 after reset by the line pulse $LP_1$ shown in FIG. 17(b). Further, the printing data signal $D_0$ (L) indicating the density of low level included in the low density region, of which the level is ranged from 0 to 15, shown in FIG. 17(d) or the printing data signal $D_0$ (H) indicating the density of high level included in the high density region, of which the level is ranged from 192 to 255, shown in FIG. 17(f) is supplied to the comparator 208. Therefore, the signal SD representing the results of the comparison of the data indicated by the signal LVL with that indicated by the signal $D_0$ (L) or $D_0$ (H) in the comparator 208 is fed to the thermal head every time the line pulses $LP_1$ is inputted to the level counter 207. Thus, in this case, the pitch of printing dots is D/2 as shown in FIG. 17(h).

Further, FIG. 17(e) shows the signal $D_0$ (M) indicating the density of intermediate level included in the intermediate density region, of which the level is ranged from 16 to 191. The signal $D_0$ (M) is inputted to the comparator 208 every second inputting of the line pulse $LP_1$ shown in FIG. 17(b) to the level counter 207, that is, in synchronization with the line pulse $LP_2$ shown in FIG. 17(c). Thus, the signal SD representing the results of the comparison of the density indicated by the signal $D_0$ (M) with the level indicated by the signal LVL is outputted to the thermal head 220 every time the line pulse $LP_2$ inputted to the circuit 21. In this case, the pitch of printing dots is equal to the pitch D of arranging the heat emitting elements in the primary scanning direction as previously described with reference to FIG. 16(b).

In other words, in this embodiment, data on the same line are basically printed twice at a pitch of which the length is half of that of the pitch in the primary scanning direction in case of the conventional method. However, at the second time of printing the same data, the data is really printed if the density indicated by the data is in the low or high density region but not printed if the density is in the intermediate density region.

FIG. 18 is a schematic block diagram for showing still another thermal printing apparatus embodying the present invention. This apparatus is different in construction from the embodiment of FIG. 13 in that the printing controlling circuit 221 is removed from the signal processing circuit 210C of FIG. 13 and the density controlling circuit 222 is provided therein.

In the circuit of FIG. 18, the page pulse PP, the line pulse LP as used in the conventional apparatus and the reference clock signal CK are inputted into the address generating circuit 205 and further the address signal ADR' is outputted from the address generating circuit 205 to the energizing period controlling circuit 206. Further, a first latch pulse $LCK_1$ and a second latch pulse $LCK_2$ are outputted from the address generating circuit 205 to the density controlling circuit 222.

Furthermore, the first latch pulse $LCK_1$ is also supplied to the latch circuit of the thermal head 20. Further, a latch pulse $LCK_0$, which corresponds to a clock pulse fed to the level counter 207, is outputted from the density controlling circuit 222 to the level counter 207 which supplies the density level signal LVL to both the density level controlling circuit 206 and the comparator 208.

Except for the above described point, the configuration of circuits of the apparatus is the same with that of the apparatus of FIG. 13. Moreover, the configuration and operation of the energizing period controlling circuit 206 and the configuration and operation of the comparator 208 are the same with that of the corresponding circuit of FIG. 10.

Hereinafter, the detail configuration of the density controlling circuit 222 will be described by referring to FIG. 19.

As shown in this figure, the density controlling circuit 206 comprises a ROM 222a, an OR-gate 222b and an AND-gate 222c.

Figure 26:
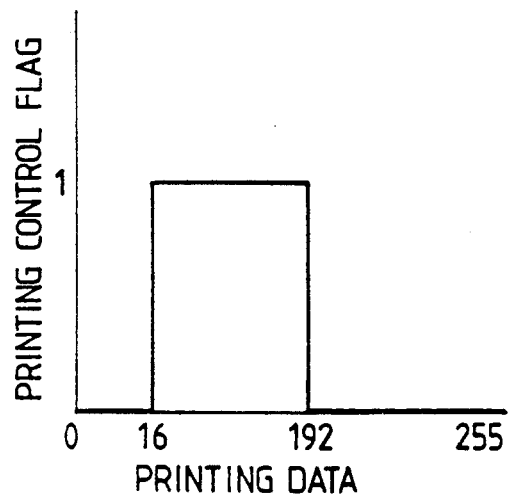
FIG. 26 is a diagram for showing the relation between the density level and a density control flag.

Furthermore, the density level signal LVL is inputted to the ROM 222a and then a signal LF indicating a density controlling flag corresponding to the level indicated by the signal LVL is outputted to the OR-gate 222b. When the signal LF stands at high level (corresponding to a level "1" as shown in FIG. 26), the contents of the level counter 207 are incremented by the first latch pulse $LCK_1$ every time the printing data to be printed in the primary scanning direction are read out of the memory 204. In contrast, when the signal LVL stands at low level (corresponding to a level "0" as shown in FIG. 26), the contents of the level counter 207 are incremented by one at a time in synchronization with the second latch pulse $LCK_2$, which is obtained by dividing down the frequency of the first latch pulse $LCK_1$ by two. Thus, by making the level of the signal LF low if the density indicated by the printing data is in the low density region, in which the level is ranged from 0 to 15, or in the high density region, in which the level is ranged from 192 to 255, the number of times of effecting the comparison in the comparator 208, that is, the energizing periods of heating the resistors are increased with respect to the data of which the density is in the low or high density region at which the recording paper is insensitive to heat emitted from the resistor. Further, the second latch pulse $LCK_2$ is inputted to another terminal of the OR-gate 222b. Moreover, the output of the OR-gate 222b and the first latch pulse $LCK_1$ are inputted into the AND-gate 222c of which an output signal is outputted to the level counter 207 as a latch pulse $LCK_0$.

Hereunder, an operation of this embodiment will be described in detail.

Figure 20:
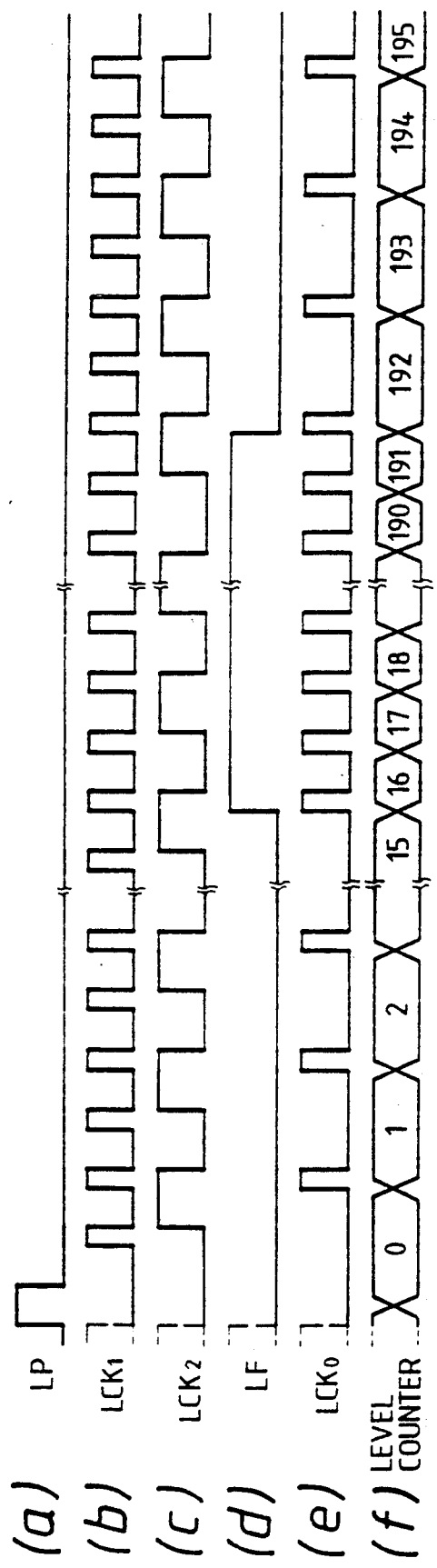
FIG. 20 is a timing chart for illustrating the operation of the embodiment of FIG. 18.

FIG. 20 is a timing chart for illustrating the operation of this embodiment.

When the line pulse LP is inputted to the address generating circuit 205 as shown in FIG. 20(a), the first latch pulse $LCK_1$, which is outputted when n addresses (n is the number of the resistors) are counted, and the second latch pulse $LCK_2$, which is reset by the signal LP and repeats the rise and fall thereof at the period corresponding to that of the first latch pulse $LCK_1$, are inputted to the density controlling circuit 222.

Figure 19:
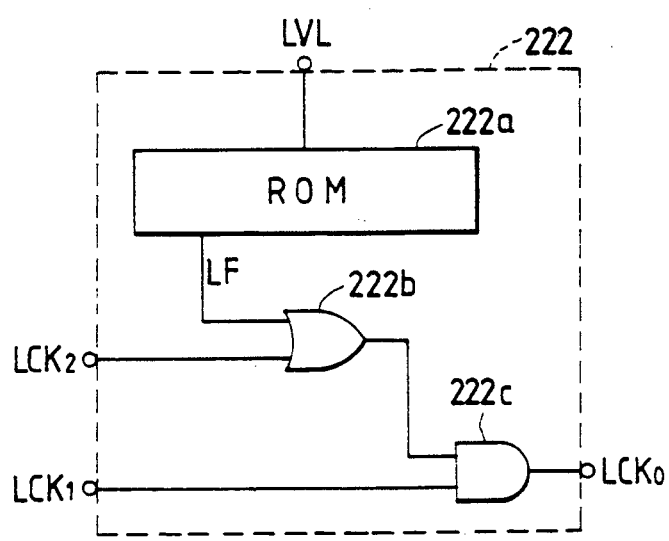
FIG. 19 is a block diagram for showing the detail configuration of the density controlling circuit of FIG. 18.

At that time, as described above, the signal LF is outputted from the ROM 222a of the density controlling circuit 222 (see FIGS. 19 and 20(d)). Thus, the OR-gate 222b outputs a signal indicating logical OR of the signals $LCK_2$ and LF which is equivalent to the signal $LCK_2$ in case that the density represented by printing data is in the low or high density region. As shown in FIG. 19, the AND-gate 222c outputs a signal representing logical AND of the first latch signal $LCK_1$ and the output signal of the OR-gate 222b. The output of the AND-gate 222c is equivalent to logical AND of the first and second latch pulses $LCK_1$ and $LCK_2$ in case that the density represented by the printing data is in the low or high density region. Thus, as shown in FIG. 20(e), the clock pulse $LCK_0$ of the level counter 207 is outputted at a period which is twice that of the period of the latch pulse $LCK_1$.

The level counter 207 shown in FIG. 18 receives the clock pulse $LCK_0$ and counts the density level signal LVL as shown in FIG. 20(f). As a consequence, the output of the level counter 207 is incremented in synchronization with the latch pulse $LCK_0$ (see numerals indicating the incremented count shown in FIG. 20(f)).

On the other hand, the address generating circuit 205 of FIG. 18 repeatedly reads out n input data (n is the number of the resistors of the thermal head) from the memory 204 as previously described and outputs the first latch clock $LCK_1$ in synchronization with this reading operation. Thus, each of n printing data is compared with the same density level signal LVL two times. Further, if the density indicated by the printing data is in the low or high density region, the signal SD indicating the results of the comparison is supplied to the shift register of the thermal head 220, thereby performing the printing of characters by means of the thermal head 220.

On the other hand, if the density represented by the printing data is in the intermediate region, the level flag indicated by the signal LF outputted from the ROM 222a of the density controlling circuit 222 of FIG. 19 stands at high level. Thus, the latch pulse $LCK_1$ is outputted from the AND-gate 222c as $LCK_0$ (see FIG. 20 (e)). Therefore, when the level of the density is in the low or high density region, the period of the clock pulse $LCK_0$ inputted to the level counter 207 of FIG. 18 is twice that of this pulse in case that the level is in the intermediate region (see FIGS. 20 (e) and (f). Thus, in this state, the signal processing circuit 10C operates in the same manner as the signal processing circuit 210A of FIG. 10. That is, the printing data are compared with the level indicated by the signal LVL in the comparator 208 with the level indicated by the signal LVL being incremented every time the printing data of one line are printed. The resistors of the thermal head are selectively energized by the signal SD outputted from the comparator 208 indicating the result of the comparison.

As above described, in this embodiment, the frequency of the comparison effected in the comparator 208 in case where the levels are in the low and high density regions, in which the sensitivity of the recording paper to heat is small, is greater than that of the comparison in case where the levels are in the intermediate region, in which the sensitivity of the paper is sufficiently large. Thus, the energizing period in case where the levels are in the low and high density regions is longer than that in case where the levels are in the intermediate region, though the total period of time required to print data is not lengthened. Thereby, the actual density of the printed dots in case where the levels are in the low and high density regions can be improved without lengthening the total period of time required to print characters and figures.

Next, FIG. 27 is a schematic block diagram for showing a still further embodiment of the present invention. In this embodiment, a starting pulse is inputted to a terminal 301 and density data are inputted to a terminal 302. Further, a reference clock pulse is inputted to a terminal 308.

The density data inputted to the terminal 302 are sent to the data storage 304 and stored therein. On the other hand, the reference clock pulse signal inputted to the terminal 308 and a pulse signal (hereunder referred to as (1/p) division starting pulse) obtained by dividing down the frequency of the starting pulse by p in a frequency divider 303 and sent therefrom are supplied to an address counter 309. This address counter 309 sends address signals (hereunder sometimes referred to as first address signals), which are to be sent out therefrom for the first time, to the data storage 304 which outputs density data (sent from the A/D converter 309 for the first time) corresponding to the first address data to a data correction circuit 306. Further, this data correction circuit 306 corrects the density indicated the input density data and sends out part of the corrected density data, which are represented by using bits of the number greater than that of bits representing the input density data, to a density data comparing circuit 312 by way of a data converting circuit 307. At that time, the count indicated by the data counter 311 is set as 1. Further, reference density data are sequentially incremented in accordance with the count and are supplied from the data counter 311 to the density data comparing circuit 312 whereupon the density data are compared with reference density data "1" corresponding to the minimum level of density required for coloring. If the density data are equal to or greater than the reference density data, the circuit 312 outputs a control data "1". In contrast, if less than the reference density data, the circuit 312 outputs another control data "0".

Upon completion of the above described processing of the density data corresponding to the first address signal, the address counter 311 subsequently sends addresses for the second, third, . . . and k-th time to the data storage 304 which sequentially sends out the respective density data corresponding to the addresses (hereunder referred to as the second, third, . . . n-th addresses) sent from the counter 311 for the second, third, . . . and k-th time every time receives each of the addresses. The density data (hereunder referred to as the second, third, . . . and n-th density data) read out from the second, third, . . . and n-th addresses of the data storage 304 correspond to the density data printed by the resistors $R_1 \sim R_n$ provided in a linear thermal head portion 313 for emitting heat, respectively. The density data comparing circuit 312 compares each of the second, third, . . . and n-th density data with the reference density data and sends the control data "1" or "0" to the thermal head portion 313 which fetches the control data represented by n-bits supplied by the density data comparing circuit 312 corresponding to the first to n-th addresses.

Upon completion of counting the first to n-th addresses, the address counter 309 sends data transferring pulses to the data counter 311 and the thermal head portion 313. When this data transferring pulse is send out, the data counter 311 supplies heating pulses to the address counter 309 and an AND-circuit 310 at the same time. The reference density data is changed from "1" to a second reference density data "2" which is the minimum density data but one. On the other hand, the reference clock signal is supplied to a terminal of the AND-circuit 310 from the terminal 308. Thus, simultaneously with receiving the heating pulse, the AND-circuit 310 outputs a pulse to the thermal head portion 313.

Further, the address counter 309 is reset by the heating pulse and thereafter counts n addresses again. Further, n density data are compared with the second reference density data in the density data comparing circuit 312. When the second reference density data is 2, the data counter 311, the AND-circuit 310 and so on operates similarly as in case where the reference density data is 1. Thus, in the thermal head portion 13, electric current flows through necessary resistors for emitting heat in accordance with the control data.

Figure 29:
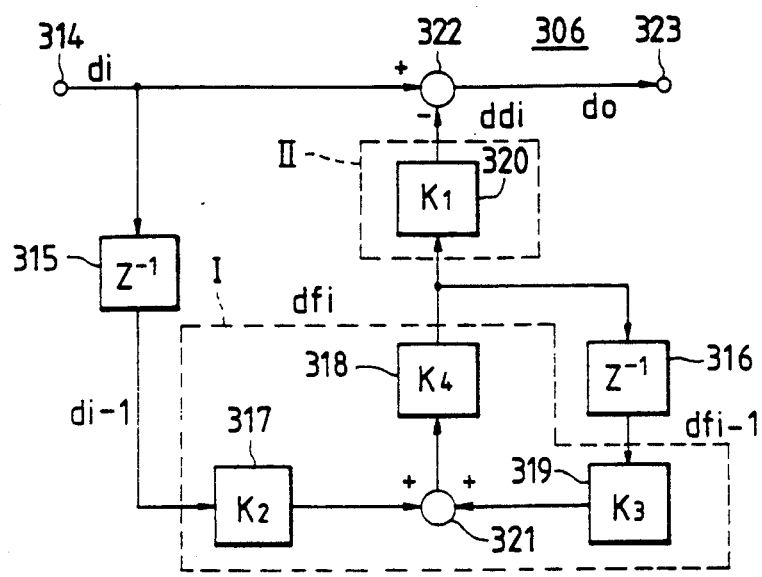
FIG. 29 is a schematic block diagram showing the construction of an example of the data correction circuit.

FIG. 29 is a schematic block diagram showing the construction of the data correction circuit which was proposed in the Japanese Patent Application No. 196855/87. In this figure, reference numeral 314 indicates an input terminal; 15 and 16 delaying means; 317, 318, 319 and 320 coefficient multiplying circuits; 322 a subtractor; and 323 an output terminal.

First, digital data $d_i$ of the densities of characters or figures to be printed are inputted to an input terminal 314. Further, the digital data $d_i$ inputted form the input terminal 14 are supplied to the subtractor 22 and the delaying means 15. This delaying means 315 comprises a random access memory (RAM) and is used to delay the density data of characters or figures on one line. The density data $d_{i-1}$ outputted by the delaying means 315 corresponds to a line immediately prior to the line i of which the characters or figures have the density indicated by the data $d_i$. Further, the data $d_{i-1}$ are fed to the coefficient multiplying circuit 322 having the coefficient $K_2$ whereupon the data $d_{i-1}$ is multiplied by the coefficient $K_2$. Thereafter, the result is outputted from the circuit 322 to the adder 321.

Further, the adder 321 adds data $K_3 \times d_{fi-1}$ outputted from the coefficient multiplying circuit 319 having a coefficient $K_3$ whereupon historical data $d_{fi-1}$ corresponding to the line prior to the line i by two lines is multiplied by the coefficient $K_3$ to data $K_2 \times d_{i-1}$ outputted from the coefficient multiplying circuit 325 and outputs the result $(K_2 \times d_{i-1} + K_3 \times d_{fi-1})$. The output of the adder 321 is sent to the coefficient multiplying circuit 318 having a coefficient $K_4$ and is multiplied by the coefficient $K_4$ therein. Further, the result $K_4 \times (K_2 \times d_{i-1} + K_3 \times d_{fi-1})$ is outputted from the circuit 318 as correction data $d_{fi}$ which is delayed in the delaying means 16 by an amount corresponding to one line as historical data $d_{fi}$ and is used to correct data of the next line.

Furthermore, output data $d_{fi}$ of the coefficient multiplying circuit 18 is supplied to the coefficient multiplying circuit 20 having a coefficient $K_1$, by which correction data $dd_i = K_1 \times d_{fi}$ is obtained and outputted to the subtractor 322. Further, the subtractor 322 obtains corrected data $d_0$ by subtracting the correction data $dd_i$ from the input data $d_i$. The thus obtained data $d_0$ is outputted from the output terminal 323 and used as density data.

The above described process can be described by the following set of equations:

$d_0 = d_i - dd_i$ $dd_i = K_1 \times d_{fi}$ $d_{fi} = K_4 \times (K_2 \times d_{i-1} + K_3 \times d_{fi-1})$ $d_{f0} = 0.$ The coefficient $K_1$ indicates the ratio of the difference between the input data $D_i$ and the corrected data $D_0$ to the value of the input data $D_i$ which is taken when the sufficient period of time has been passed since inputted. Further, the coefficients $K_2$, $K_3$ and $K_4$ are used to determine the time constant of the corrected data. If the coefficient $K_2$ is made small and the coefficient $K_3$ is made larger, the time constant of the corrected data becomes larger.

The data correction circuit 306 is provided to prevent deterioration of the quality of the printed image due to heat regeneration of the linear thermal head portion 313. The circuit 6 prevents the deterioration of the quality of the image by producing the recording data of the current line to be printed from the recording data of the line, which is prior to the current line by one line, and the correction data corresponding to the line which is prior to the current recording line by two lines.

Figure 30A:
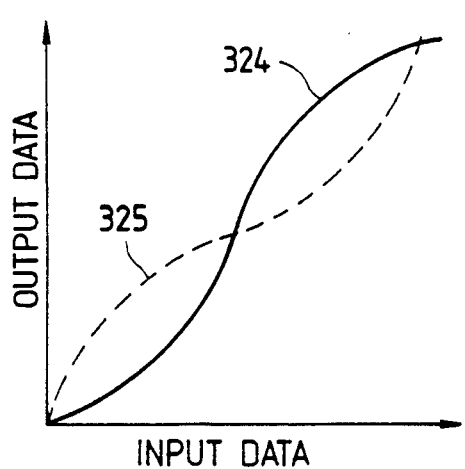
FIG. 30(a) is a graph for showing the printing density characteristics of the conventional case in which the densities of the data are not corrected and the density correcting characteristics realized by the data correction circuit.
Figure 30B:
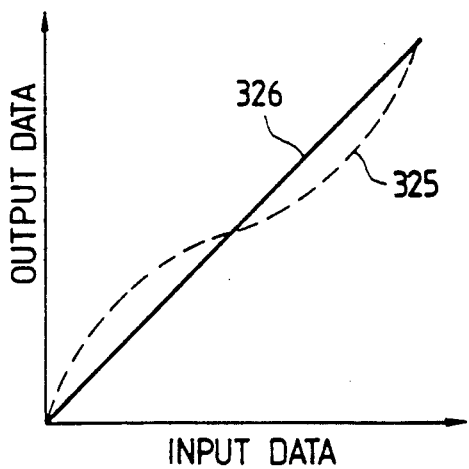
FIG. 30(b) is a graph for showing preferable printing density characteristics.

The similar results of data correction can be obtained by another data correction circuit which performs the data correction on the basis of a data conversion table corresponding to density correcting characteristics as will be shown in FIGS. 30 (a) and (b), instead of providing the data correction circuit 306 which operates as above described.

In FIG. 30 (a), a solid curve 324 indicates printing density characteristics of the conventional case in which the densities of the data are not corrected. On the other hand, in FIGS. 30 (a) and (b), a dashed curve 325 indicates the density correcting characteristics realized by the data correction circuit. Further, output density data indicated by ordinates in these figures are proportional to the actual density of characters or figures printed on the recording paper. Thus, by further converting the output density data represented by the solid curve 324 by the data correction circuit of which data correcting characteristics are shown by the dashed curve 325, preferable printing density characteristics represented by a solid curve 326 in FIG. 30 (b). The data correcting circuit receives the input data represented by using j bits and outputs density data represented by at least j+1 bits, that is, by bits of the number more than j by effecting addition and subtraction and so on. Accordingly, for the purpose of printing a character by dividing the output density data represented by using at least j+1 bits corresponding to one line into data corresponding to a plurality of split lines, it is necessary to convert such output density data into a plurality of divided density data of bits of the number equal to or less than j. The data conversion circuit 307 is a circuit composed of, for example, a ROM as shown in FIG. 28 (a), which receives data represented by bits of j+1 or more and then converts the data into a plurality of divided density data each represented by bits of the number equal to or less than j.

In FIG. 28 (a), reference character X indicates the number of additional bits for the correction of the density data; Y the number of bits corresponding to the divisor used to divide the density data; c, d and 1 data shown in FIG. 27; $D_1, \ldots$ and $D^j_{+x}$ signals each indicating the value at each bit of the data d; and $L_1, \ldots$ and $L_y$ signals each indicating the value at each bit of the data 1. Incidentally, data 1 is digital data corresponding to the ratio of the frequency of input data to that of output data of the frequency divider 303. FIG. 28 (b) shows an example of data indicated by signals $D_1, \ldots D^j_{+x}, L_1, \ldots$ and $L_y$ in case that the numbers j, X and Y are 6, 8 and 4, respectively.

Thus, if the number of bits indicating data c is increased, the burden to the data processing is not increased by effecting the division of the density data corresponding to the increase in number of the bits. This achieves the reproduction of an image represented by further greater number of density levels than in the prior art.

In case of this embodiment, as described above, the density data printed by a line of dots in the conventional apparatus is printed by a plurality of split lines of dots each having the divided value of the density data. Thus, similarly as in case of the above described embodiment, the sufficient density of printed dots can be obtained by this embodiment without causing heat deterioration on the surface of the recording paper. The reason will be further detailedly described hereinbelow.

Figure 31:
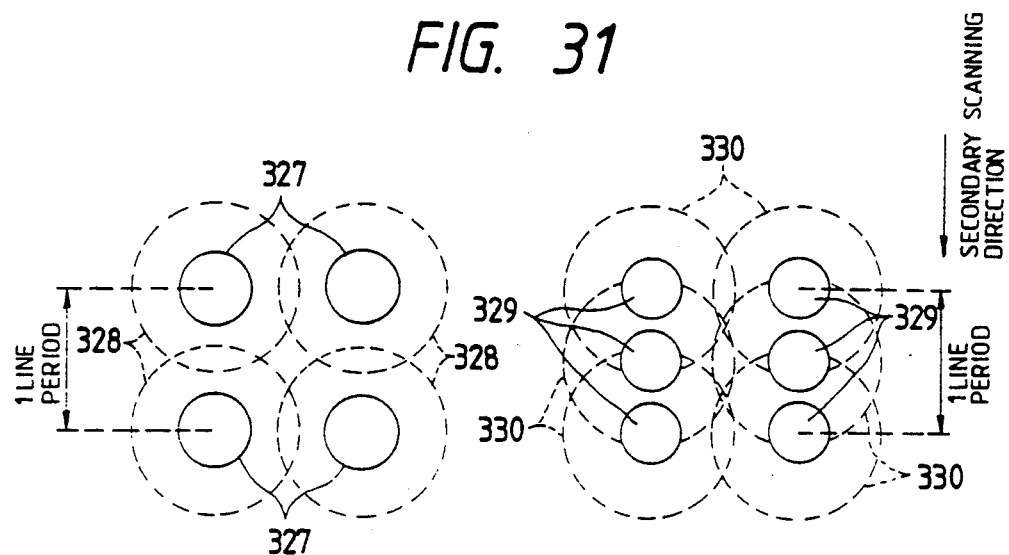
FIG. 31(a) is a diagram for showing the shapes of printed dots in case of the conventional case.
FIG. 31(b) is a diagram for showing the shapes of printed dots in case of the embodiment of FIG. 27.
Figure 32:
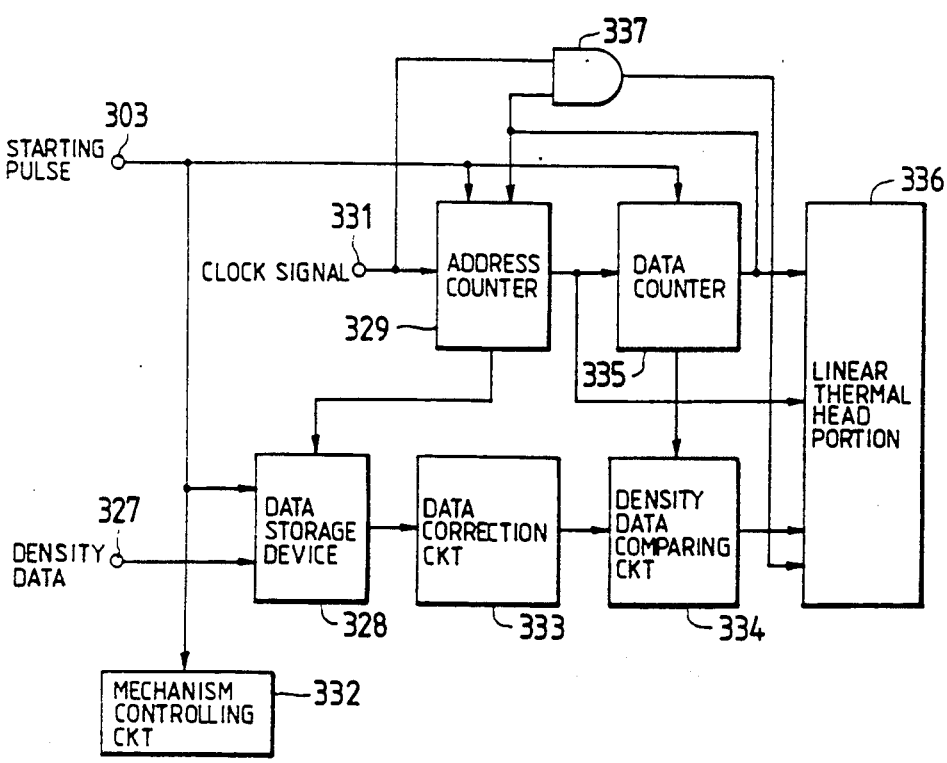
FIG. 32 is a schematic block diagram for showing the construction of the related density controlling apparatus.

In case of the conventional method as shown in FIG. 31 (a), the period of energizing the resistor of the thermal head corresponding to one dot is longer than in case of this embodiment. Thus, the diameter of the printed dots is larger than the latter case of FIG. 31 (b). As described above, the distribution in temperature of the surface of the resistor of the thermal head is shaped like a hanging bell. That is, the closer the position reaches the center of the resistor, the higher the temperature becomes. Thus, each of the printed dots has a portion 327 of high density in the center thereof and a portion 328 of low density in the peripheral portion thereof. In other words, the portion of high temperature is centralized in the center portion of each resistor, thereby causing the heat deterioration of the surface of the recording paper. In contrast, in case of this embodiment, as shown in FIG. 31 (b), the dots are printed by dividing the period of time corresponding one line printed by the conventional apparatus into a plurality of periods of time. Further, in case of this embodiment, the diameter of the portion 329 of high temperature becomes somewhat smaller than that in the conventional case. However, in comparison with the conventional case of FIG. 31 (a), by overlapping portions 330 of low density, the density is relatively uniform over the whole area to be printed. Furthermore, the extent of the centralization of the portion of high temperature can be decreased. Thereby, the deterioration of the surface of the recording paper can be prevented.

While a preferred embodiment of the present invention has been described above, it is to be understood that the present invention is not limited thereto.

Further, it is to be understood that other modifications will be apparent to those skilled in the art without departing from the spirit of the invention. The scope of the present invention, therefore, is to be determined solely by the appended claims.

What is claimed is:

1. A thermal printing apparatus for printing input gradational images, characters and figures by using multilevel density, said printing apparatus comprising:
   a linear thermal head having n resistors arranged in a row for emitting heat;
   density controlling means for regulating multilevel durations for energizing said resistors in accordance with n gradational printing data each corresponding to a respective one of said resistors; and
   data conversion means for receiving as printing data a set of n original data for each of a plurality of lines, which are respectively parallel with said row of n resistors, and for producing p sets of n data for p split lines on the basis of said n original data, where p is an integer equal to or greater than two, each of said p split lines being disposed in an area in which the line corresponding to said printing data should be printed, in parallel with said row of n resistors, said p sets of n data being sequentially supplied to said density controlling means set by set to print an original line corresponding to said printing data by printing the split lines corresponding to the original line split line by split line by shifting said linear thermal head in a direction perpendicular to said row of n resistors every time each of the split lines is printed, so that each of said n printing data is represented by p dots, wherein values of p data produced on the basis of each of the original data, which values indicate the durations for energizing each of said resistors, are fixed such that said durations are separately shorter than a duration indicated by each of the original data.

2. A thermal printing apparatus as set forth in claim 1, wherein said data conversion means includes:

frequency dividing means for receiving a printing timing signal and for outputting a split line number signal, of which the frequency is p times that of the printing timing signal; and data converting means for receiving the split line number signal and an input signal representing the set of n original data for each of said plurality of lines and for then multiplying each of the n original data by $\alpha$, where $\alpha$ is a constant value less than 1, each time the split line number signal is received, thereby producing the p sets of n data for p split lines.

3. A thermal printing apparatus as set forth in claim 2, wherein said data converting means comprises a read-only memory for receiving the split line number signal and the input signal and for dividing each of the n original data by p.

4. A thermal printing apparatus as set forth in claim 2, wherein said data converting means comprises:

an AND-gate for receiving the split line number signal and a least significant bit signal representing the least significant bit of each of the n original data and for outputting a first signal representing the logical AND of the split line number signal and the least significant bit signal;

a first adder for receiving signals representing lower order bits of each of the n original data and the first signal and for outputting signals representing lower order bits of each of the n data and a carry signal; and a second adder for receiving signals representing higher order bits of each of the n original data and the carry signal and for outputting signals representing higher order bits of each of the n data.

* * * * *